United States Patent
Mangaroo et al.

(10) Patent No.: US 8,800,875 B2
(45) Date of Patent: Aug. 12, 2014

(54) PISTOL GRIP FOR A PORTABLE TERMINAL WITH AN INTERNAL RECEPTACLE FOR A STYLUS

(75) Inventors: Alan Mangaroo, Oakville (CA); Bo Xu, Mississauga (CA); Dinesh Gandhi, Brampton (CA); Barry Boyd, Oakville (CA); Eddie Cantal, Mississauga (CA)

(73) Assignee: Psion Inc., Mississauga, Ontario (CA)

( * ) Notice: Subject to any disclaimer, the term of this patent is extended or adjusted under 35 U.S.C. 154(b) by 246 days.

(21) Appl. No.: 12/689,072

(22) Filed: Jan. 18, 2010

(65) Prior Publication Data

US 2010/0170952 A1 Jul. 8, 2010

Related U.S. Application Data

(63) Continuation of application No. 12/180,865, filed on Jul. 28, 2008, now Pat. No. 7,651,029.

(51) Int. Cl.
*G06K 7/10* (2006.01)

(52) U.S. Cl.
USPC .................................................. 235/472.01

(58) Field of Classification Search
CPC ......................... G06K 7/10881; G06K 7/1098
USPC ............. 235/462.45, 462.46, 462.47, 462.49, 235/472.01
See application file for complete search history.

(56) References Cited

U.S. PATENT DOCUMENTS

| | | | |
|---|---|---|---|
| 5,349,497 A * | 9/1994 | Hanson et al. | 361/679.58 |
| 5,736,726 A * | 4/1998 | VanHorn et al. | 235/472.02 |
| 6,392,639 B1 * | 5/2002 | Lee et al. | 345/179 |
| 6,407,911 B1 | 6/2002 | Spence et al. | |
| 6,708,887 B1 | 3/2004 | Garrett et al. | |
| 6,999,797 B2 * | 2/2006 | Crawford et al. | 455/564 |
| 2005/0017078 A1 | 1/2005 | Bhatia et al. | |
| 2007/0108291 A1 * | 5/2007 | Bhatia et al. | 235/472.01 |
| 2007/0165384 A1 * | 7/2007 | Vejnar | 361/724 |
| 2008/0163504 A1 | 7/2008 | Smith et al. | |

OTHER PUBLICATIONS

Notice of Allowance mailed Sep. 23, 2009 in Counterpart U.S. Appl. No. 12/180,865, Alan Mangaroo, filed Jul. 28, 2008.

* cited by examiner

*Primary Examiner* — Christopher Stanford

(57) ABSTRACT

A handle for a portable terminal having a user interface configured for interaction with a stylus. The handle comprises a handle body having the grip portion shaped for grasping by a hand of the user of the portable terminal, a proximal end of the grip portion for coupling to a housing of the portable computer, and a distal end of the grip portion. The handle has a receptacle connected to the handle body and located in the interior of the handle body, such that the receptacle is adapted for releasably retaining the stylus in the interior of the handle body. The handle body 21 has an aperture for facilitating access of the stylus into the receptacle. The receptacle has at least one arm having a first shaped feature (e.g. protrusion and/or notch/groove) adapted for engaging a second shaped feature (e.g. corresponding notch/groove and/or protrusion) of the stylus for providing the releasable retaining of the stylus when resident in the receptacle. The arm is biased towards a first position for facilitating the engagement of the first shaped feature (e.g. protrusion and/or notch/groove) with the second shaped feature (e.g. corresponding notch/groove and/or protrusion).

27 Claims, 20 Drawing Sheets

PISTOL GRIP FOR A PORTABLE TERMINAL WITH AN INTERNAL RECEPTACLE FOR A STYLUS

This application is a continuation of U.S. patent application Ser. No. 12/180,865, filed Jul. 28, 2008 which is hereby incorporated by reference.

FIELD OF THE INVENTION

This invention relates to a stylus storage mechanism for a handle of a portable terminal.

BACKGROUND

It is generally known to provide a handle for scanning device such as a portable scanner for logistics environments. However, such known handles are typically either molded as an integral portion of the housing of the scanning device, or are connected to the housing fasteners and corresponding tools. In either case of a fastened handle, detachment of the handle from the scanning device is at best problematic, depending upon the tools available in the field to a user of the scanning device. In the case of an integral or otherwise permanently bonded handle to the housing of the scanning device, desired removal of the handle is not possible without potentially damaging the housing. Accordingly, current scanner handles may not allow for easy removal (e.g., for replacement, repair, cleaning, alternative configuration of the scanning device, etc.). Further, attaching the handle to the housing in a releasable fashion, while providing for a control connection between a trigger of the handle and electronic components of the scanning device, is problematic.

A further disadvantage of current portable scanning devices is hidden storage of a stylus for interacting with a user interface of the scanning device. Typically the stylus of the device is attached (e.g. via a cord) and fastened to an external surface of the device housing or handle, when not in use by the user of the device. Unfortunately, these external storage techniques of stylus can result in damage to the housing of the device, misplacement (e.g. loosing) of the stylus by the user, and/or positioning of the stylus in an awkward location on the device/handle that may interfere with the user when operating the scanning device without the current need for the stylus.

Further, triggers of current handles may not be ergonomically comfortable for operation by many different users having different sized hands. As such, the known handles and triggers can provide a non-contoured/ergonomic grip configuration, which tends to make such known triggers uncomfortable to use (e.g. premature fatigue felt by the hand of the user).

SUMMARY

It is an object of the present invention to provide a handle for a portable terminal to obviate or mitigate at least some of the above-presented disadvantages.

Typically the stylus of the device is attached (e.g. via a cord) and fastened to an external surface of the device housing or handle, when not in use by the user of the device. Unfortunately, these external storage techniques of stylus can result in damage to the housing of the device, misplacement (e.g. loosing) of the stylus by the user, and/or positioning of the stylus in an awkward location on the device/handle that may interfere with the user when operating the scanning device without the current need for the stylus. Contrary to current handles there is provided a handle for a portable terminal having a user interface configured for interaction with a stylus. The handle comprises a handle body having the grip portion shaped for grasping by a hand of the user of the portable terminal, a proximal end of the grip portion for coupling to a housing of the portable computer, and a distal end of the grip portion. The handle has a receptacle connected to the handle body and located in the interior of the handle body, such that the receptacle is adapted for releasably retaining the stylus in the interior of the handle body. The handle body 21 has an aperture for facilitating access of the stylus into the receptacle. The receptacle has at least one arm having a first shaped feature (e.g. protrusion and/or notch/groove) adapted for engaging a second shaped feature (e.g. corresponding notch/groove and/or protrusion) of the stylus for providing the releasable retaining of the stylus when resident in the receptacle. The arm is biased towards a first position for facilitating the engagement of the first shaped feature (e.g. protrusion and/or notch/groove) with the second shaped feature (e.g. corresponding notch/groove and/or protrusion).

A first aspect is a handle for a portable computer having a user interface configured for interaction with a stylus, the handle comprising: a handle body having a grip portion shaped for grasping by a hand of a user of the portable computer, a proximal end of the grip portion for coupling to a housing of the portable computer, and a distal end of the grip portion; a receptacle connected to the handle body and located in an interior of the handle body, the receptacle adapted for releasably retaining the stylus in the interior of the handle body, the handle body having an aperture for facilitating access of the stylus into the receptacle; and at least one member of the receptacle having a first shaped feature adapted for engaging a second shaped feature of the stylus for providing the releasable retaining of the stylus when resident in the receptacle, the member biased towards a first position for facilitating the engagement of the first shaped feature with the second shaped feature.

BRIEF DESCRIPTION OF THE DRAWINGS

Exemplary embodiments of the invention will now be described in conjunction with the following drawings, by way of example only, in which:

FIG. 5b a side view of the handle of FIG. 5a;

FIG. 6b shows a further view of the latch configuration of FIG. 6a;

FIG. 9b is an example receptacle for the stylus of FIG. 9a;

FIG. 10a is an alternative embodiment of the stylus of FIG. 9a;

DETAILED DESCRIPTION OF THE PREFERRED EMBODIMENT(S)

Portable Terminal 10

Figure 1:
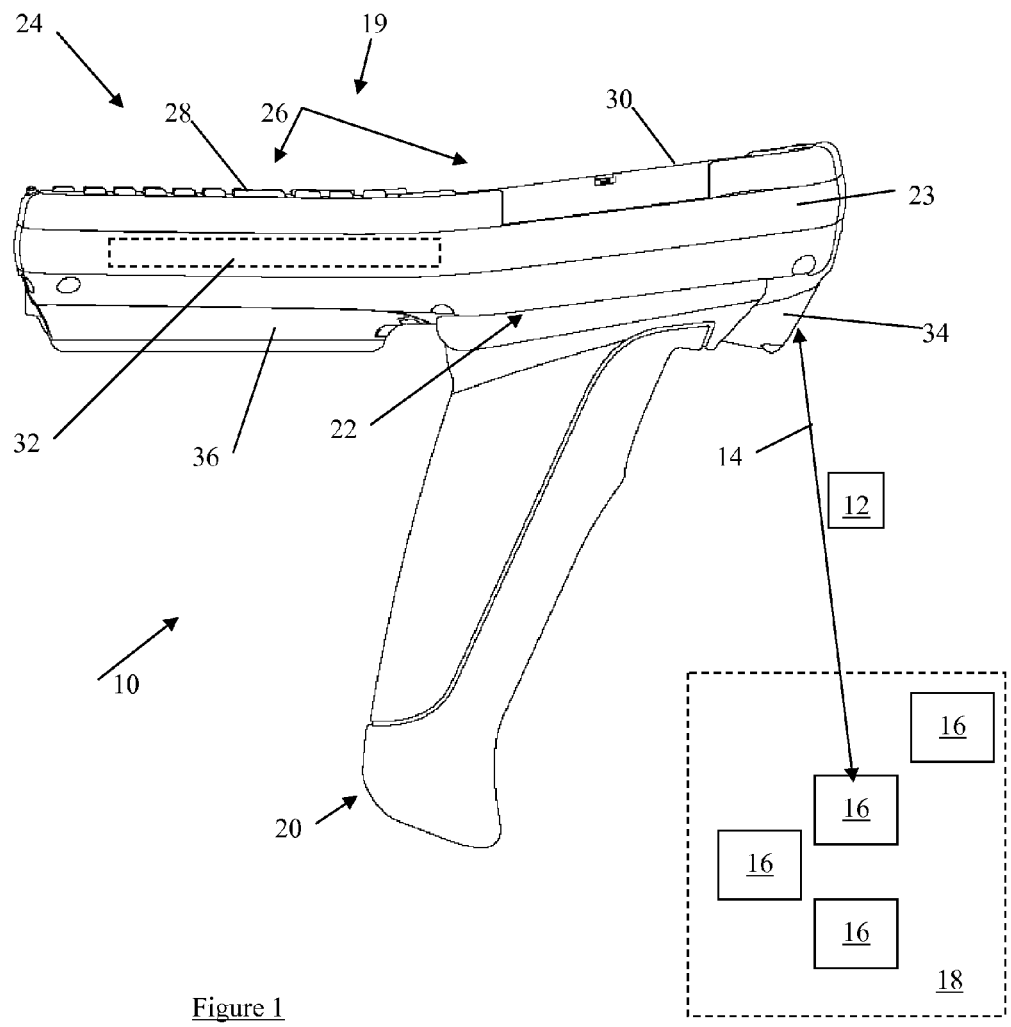
FIG. 1 is a side view of components of a portable terminal for interaction with a logistics environment.

Referring to FIG. 1, shown is a portable terminal 10 for providing imaging and/or scanning features (and/or functions) in data capture/communications 12 and asset tracking/management, for example in wireless communication 14 with tracking (e.g. information) objects 16 (e.g. barcode labels and/or RFID tags) present in one or more logistics environments 18 (e.g. industrial, retail, supply chain). It is recognised that the tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking.

The portable terminal 10 can have an optional handle 20, connected via a release securable connection 22, to an enclosure 23 of a handheld computer 24. It is also recognised that the handle 20 may be permanently or otherwise fixedly attached (e.g. not releasable) to the enclosure 23 by fastening means such as but not limited to: protrusions engaged in slots, latch mechanisms, fasteners (e.g. screws), adhesives or other bonding agents, etc. Further, it is recognised that the handle 20 may be formed (e.g. molded) as integral to at least a portion of the enclosure 23. It is recognised that in the description, the terms "housing" and "enclosure" can be used interchangeably.

The computer 24 has a number of components 19 including a user interface 26, including a keyboard 28 and a display 30 (e.g. touch screen), one or more onboard processors 32 (e.g. inside of the enclosure 23), and a scanner/radio communications module 34 (e.g. laser, WLAN with VoIP and Bluetooth, imager, etc.—inside of the enclosure 23) for facilitating the wireless communication 14. The portable terminal 10 also has an onboard power source 36 for helping to satisfy power requirements of the onboard processor(s) 32, the user interface 26, and optionally the communication module 34.

Figure 2:
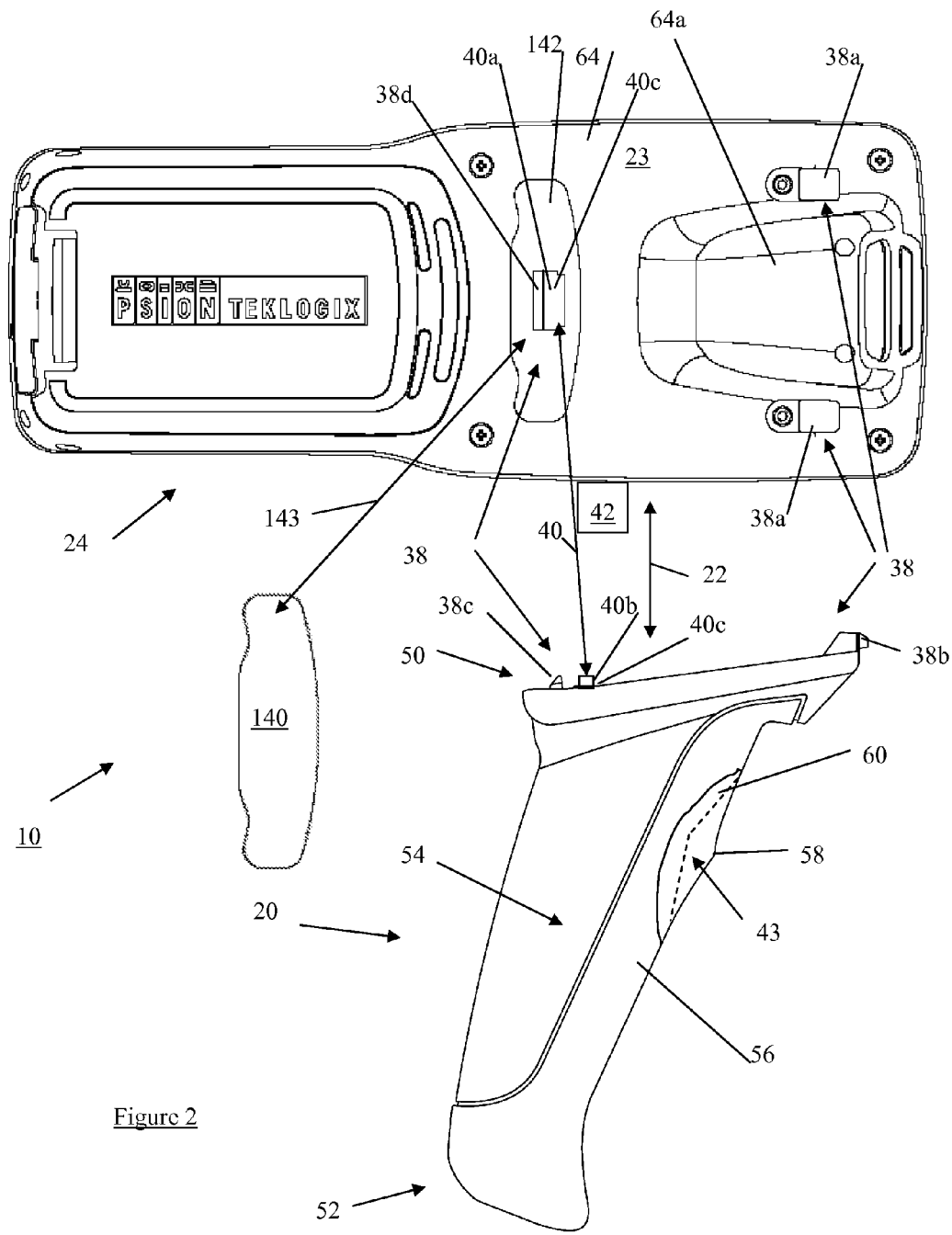
FIG. 2 is a bottom view of the portable terminal of FIG. 1.

Referring to FIG. 2, the handle 20 is shaped for grasping by a hand (not shown) of a user of the portable terminal 10, a body 21 of the handle 20 having a proximal end 50 for coupling to the enclosure 24 of the computer 26, a distal end 52, and a grip portion 54 between the ends 50,52 for grasping by the hand of the user. The grip portion 54 can optionally have an overmold portion 56, preferably made of a resiliently flexible material (e.g. rubber or other suitable polymers), for enhancing the grip of the user's hand on the body 21 of the handle 20. The overmold portion 56 can be referred to as an additional layer formed around the first part (e.g. body 21) that can be a previously molded part that is reinserted into a secondary mold for forming the additional layer on the previously molded part. For example, after injection and forming of the first molded part, i.e. the body 21, the component is rotated on a core from the one mold cavity to another. The second mold cavity is different from the first mold cavity in that the detail for the second molded part is included and used to add the overmold portion 56. The material (e.g. rubberized polymer) for the second molded part (i.e. the overmold 56) is then injected into the second mold cavity detail before the completed part (i.e. handle 20 and overmold portion 56) is ejected from the second mold. It is recognised that one example embodiment of the handle 20 is where the body 21 is made of a hard/rigid plastic material (e.g. thermoplastic polymer) while the overmold 56 is made of a softer, resilient material (e.g. thermoplastic elastomer (TPE) materials) that is adhered to the material/substrate (e.g. polypropene (PP), acrylonitrile-butadiene-styrene (ABS), polycarbonate (PC), Nylon etc.) of the body 21, thus facilitating a combined comfortable, non-slip, and abrasion-resistant grip portion 54 of the handle 20. It is recognised that other fabrication methods can be used to assemble the overmold 56 to the body 21 of the handle 20, as known to a person skilled in the art. It is also recognised that the overmold portion 56 can also be referred to as a resilient covering that can be bonded or otherwise adhered to the exterior surface of the handle body 21. It is recognised that an overmolding process is one example embodiment of the bonding/adhering of the resilient cover (e.g. the portion 56) to the grip portion 54 of the handle body 21.

Figure 3:
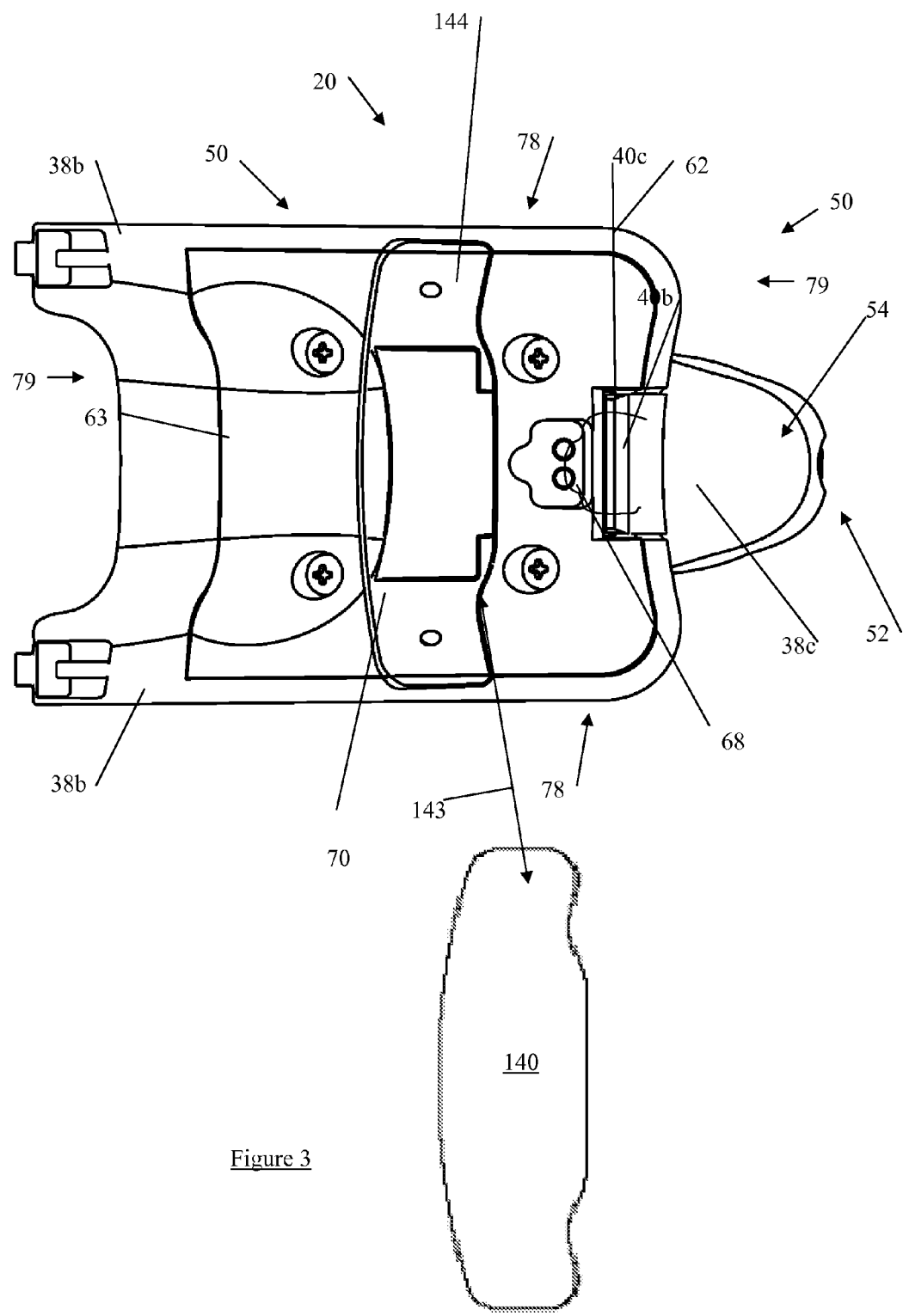
FIG. 3 is a proximal end view of a handle of the terminal of FIG. 1.

The proximal end 50 can be attached to the grip portion 54 of the body 21 via a plurality of fasteners 70 (e.g. screws), see FIG. 3, which can be configured to releasably secure the proximal end 50 to the grip portion 54, as desired.

The handle 20 also has an actuator assembly 43 (shown in dotted lines underneath the overmold portion 56). The actuator assembly 43 can have a raised portion 58, for facilitating user identification of the actuator assembly 43 underneath the overmold 56. Alternatively, or in addition, the overmold 56 can have an indicator section 60 for indicating to the user the location of the actuator assembly 43 on the grip portion 54 underneath the overmold 56. The indicator section 60, can have a material texture, colour, and/or shading different from other material of the overmold 56.

Referring to FIGS. 2 and 3, the proximal portion 50 of the handle 20 has a first surface 62 configured for mating with a second surface 64 of the enclosure 23 of the computer 24, such that a depression portion 63 of the first surface 62 can be configured to accommodate the shape (e.g. protruding portion 64a) of the enclosure 23 surrounding the communications module 34 (see FIG. 1). Maintaining the mating of the first surface 62 with the second surface 64 is facilitated by the connection 22, as further described below.

Connection 22 Configuration

Referring to FIG. 2, the handle 20 is shaped for grasping by a hand 140 (see FIG. 15) of a user of the portable terminal 10. The handle 20 is coupled to the computer 24 via the connection 22, which includes both a mechanical coupling 38 for retaining the handle 20 as physically attached to the enclosure 23 (e.g. frame) and a control coupling 40 for facilitating communication (e.g. instruction/control signals 42) between the actuator assembly 43 (e.g. trigger) of the handle 20 and one or more components 19 of the computer 24.

Control Coupling 40

Further, for example, the control coupling 40 can be configured to include an electrical contact 40a (e.g. printed circuit board (pcb) connectors such as electrically conductive pads) coupled to one or more components 19 of the computer 24 and a mating electrical contact 40b (e.g. pogo pins) coupled to the actuator assembly 43, as further described below. The electrical contact 40b is configured to establish a temporary operative electrical connection between the actuator assembly 43 and one or more components 19 of the computer 24 via the electrical contact 40a. It is recognised that the contact 40a can be the electrically conductive pad(s) and the contact 40b can be the pogo pins, as desired.

For example, the pogo pin can take the form of a slender cylinder containing two spring-loaded pins, such that when pressed between two electronic circuits (e.g. of the computer 24 via the electrical contact 40a and the actuator assembly 43), points at each end of the pogo pin make secure electrical contacts with the two electronic circuits and thereby connect them together. It is recognised that the actuator assembly 43 is configured for affecting the operation of one or more of the components 19 of the computer 24 via the instruction/control signals 42 generated through physical interaction (e.g. depressing of the trigger) of user with the actuator assembly 43. Further, an optional seal 68 (e.g. made of resilient material such as but not limited to rubber and other resilient polymers) can be positioned around a periphery of the contact(s) 40a,b (e.g. see FIG. 3) as part of the control coupling 40, in order to inhibit the ingress of water or other foreign matter between the contacts 40a,b when the handle 20 is coupled to the enclosure 23 via the mechanical coupling 38.

Further, it is recognised that the mating of the electrical contact 40a with the electrical contact 40b, i.e. the control coupling 40, can include a biasing member 40c for facilitating the mating contact between the contacts 40a,b when the mechanical coupling 38 is engaged. One example of the biasing member 40c is the springs of the pogo pins. Another example of the biasing member 40c is a resilient arm included in the configuration of at least one of the contacts 40a,b, thereby biasing the contacts 40a,b against one another when they are brought into proximity with one another during engagement of the mechanical coupling 38. In any event, due to the biased nature of the contacts 40a,b with respect to one another, it is recognised that mating of the control coupling 40 is configured so as not to interfere/inhibit with the operation (e.g. attachment and release) of the mechanical coupling 38. It is also recognised that the biasing member 40c can be included in the contact 40a, in the contact 40b or in both of the contacts 40a,b, as desired.

Mechanical Coupling 38

For example, the mechanical coupling 38 can be configured to include one or more slots 38a and mating protrusions 38b (with lip 45) and one or more latches 38c (with lip 45) and corresponding slots 38d on opposing sides 79 of the proximal portion 50, as further described below. It is recognised that the slots 38a can be located on the enclosure 23 and the protrusions 38b located on the handle 20 as shown, the slots 38a can be located on the handle 20 and the protrusions 38b located on the enclosure 23 (not shown), or a combination thereof. Further, the latch(es) 38c can be located on the handle 20 and the corresponding slot(s) 38d on the enclosure 23 (as shown), the latch(s) 38c can be located on the enclosure 23 and the corresponding slot(s) 38d on the handle 20 (not shown), or a combination thereof.

Figure 4:
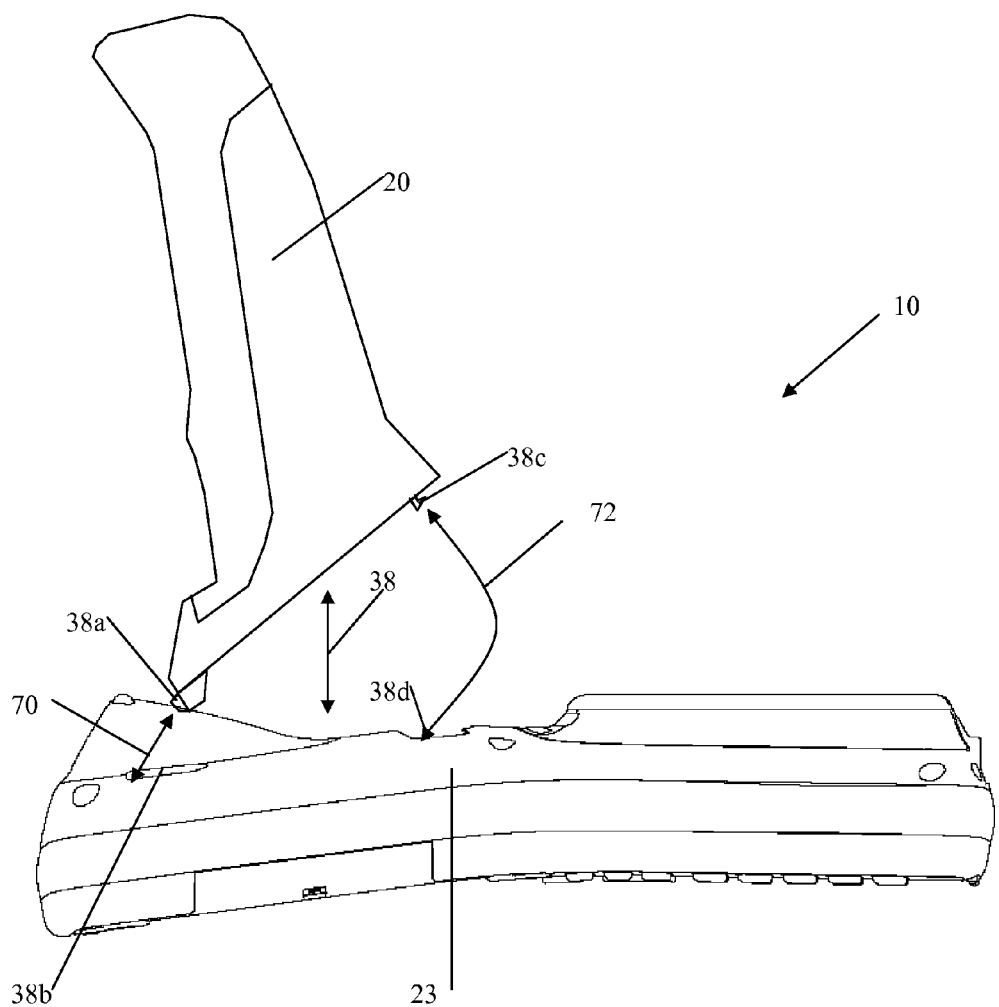
FIG. 4 shows an example coupling operation of an embodiment of the handle of FIG. 1.

Referring to FIG. 4, the mechanical coupling 38 is configured so as to facilitate attachment of the optional handle 20 to the enclosure 23 without the aid of additional tools and corresponding fasteners (e.g. screwdrivers and screws, etc.). Further, the mechanical coupling 38 is configured so as to be compatible with a specified drop rating of the portable terminal 10, while facilitating the retention of the handle 20 to the enclosure 23, once attached, until subsequently released by the user through operation of the latch(s) 38c. In order to attach the handle 20 to the enclosure 23, the protrusions 38a can be engaged/inserted 70 into the slots 38b (resulting in contact of the lips 45 (see FIGS. 5a,b and 6a,b) with an interior surface 25 (e.g. of the enclosure 23) that is adjacent to the slots 38b), and then the handle 20 can be pivoted 72 about the engaged protrusions 38a and slots 38b towards the enclosure 23 so as to engage the latch(es) 38c with the corresponding slot 38d (resulting in contact of the lip 45 with the interior surface 25 that is adjacent to the slot 38d).

Once engaged, the first external surface 62 of the proximal portion 52 is located adjacent to the second external surface 64 of the enclosure 23 (see FIGS. 2 and 3). The engagement of the latch(es) 38c with the slot(s) 38d also causes the mating of the electrical contacts 40a,b in order to provide or otherwise enable the control coupling 40. It is recognised that the latch 38c and/or the protrusions 38b project/extend outwardly from the surface 62 of the handle, when positioned thereon, and the latch 38c and/or the protrusions 38b project/extend outwardly from the surface 64 of the enclosure 23, when positioned thereon.

Figure 5A:
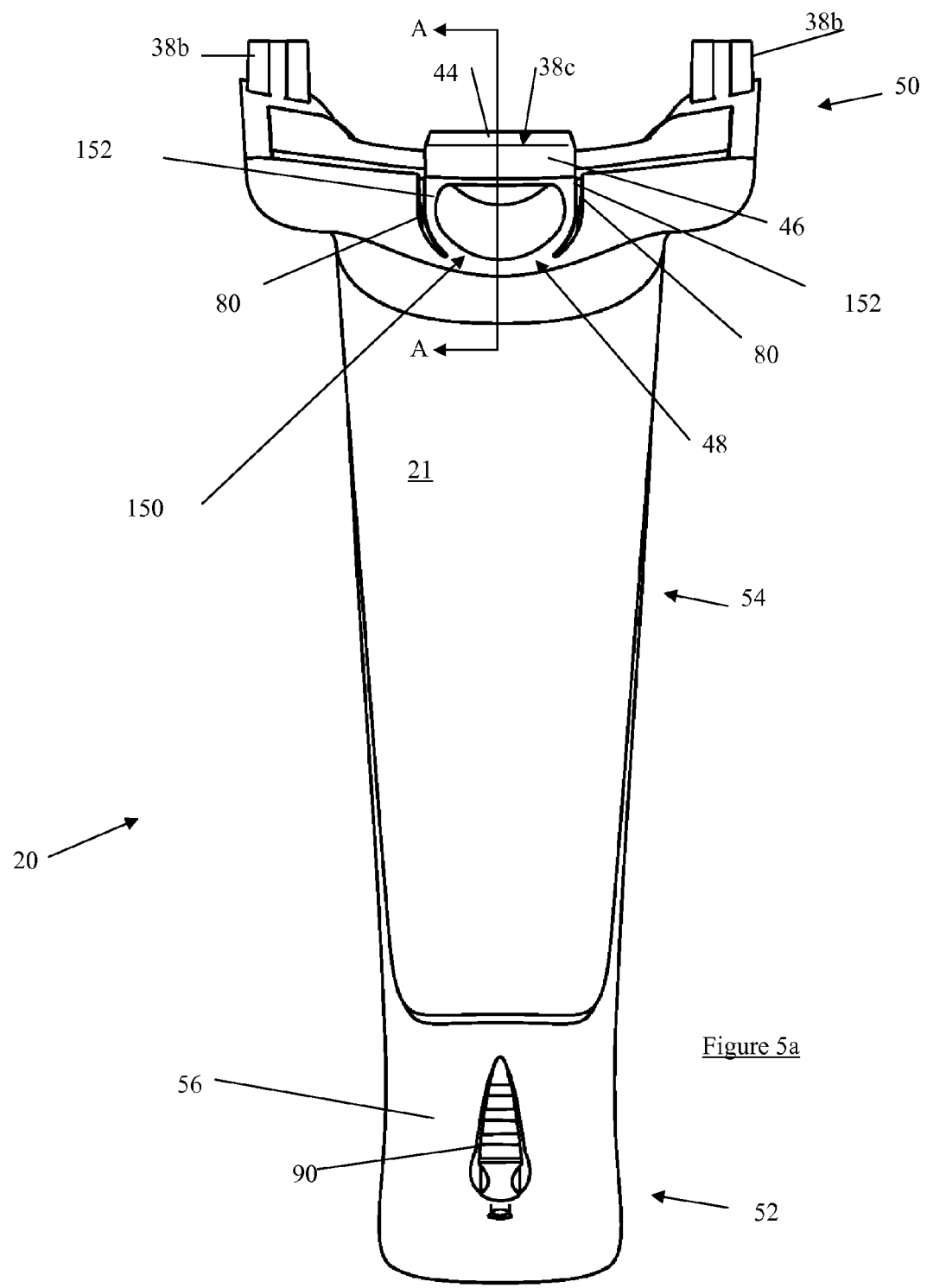
FIG. 5a a rear side view of the handle of FIG. 3.
Figure 5B:
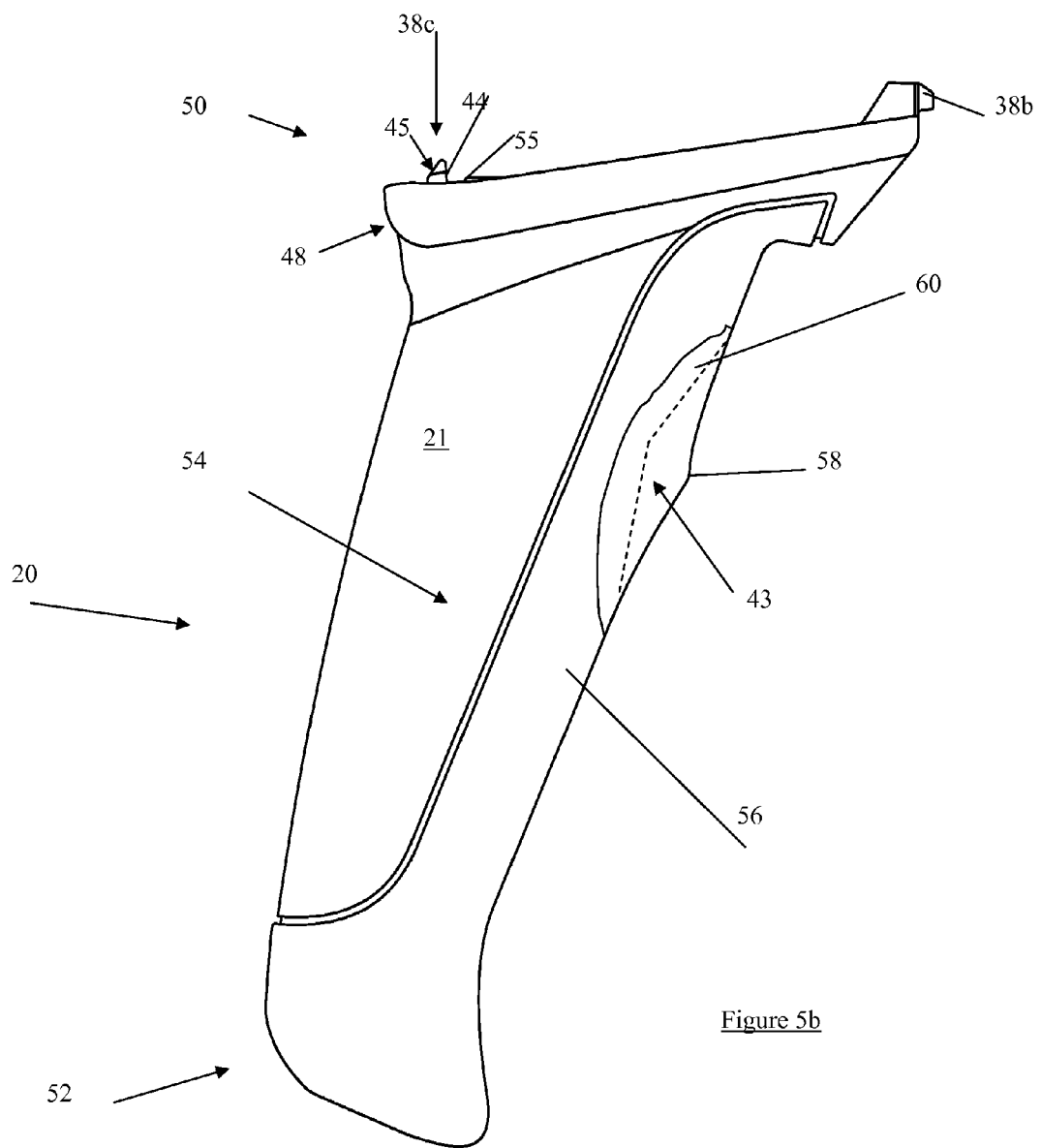
Figure 7:
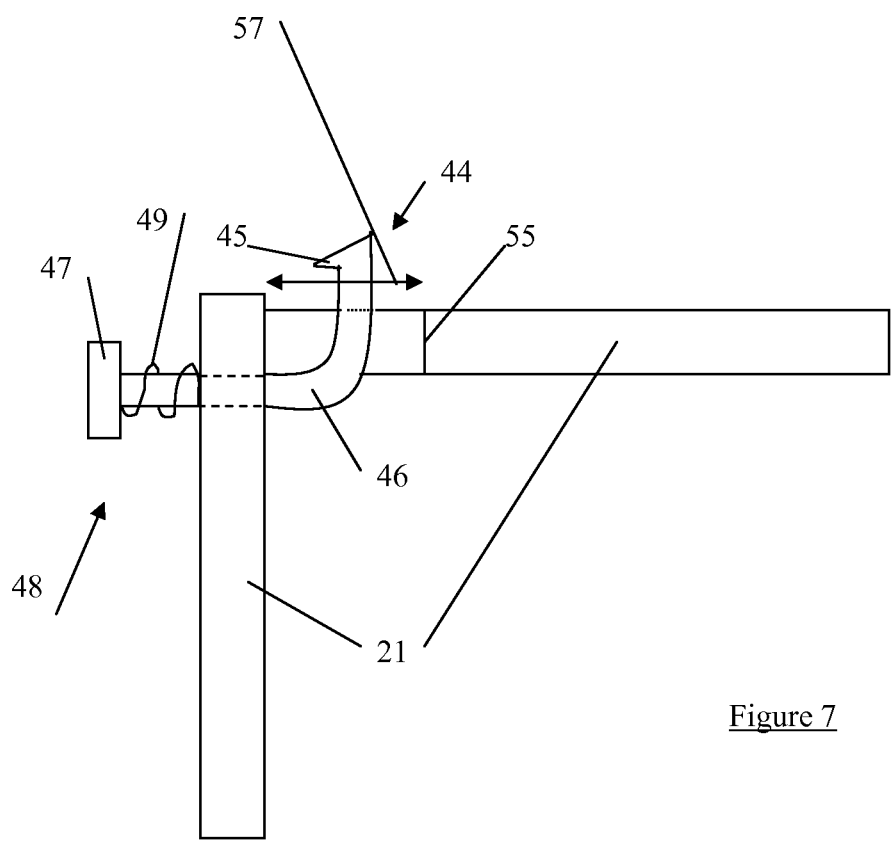
FIG. 7 is an alternative embodiment of the latch configuration of FIGS. 6a and 6b.

Referring to FIGS. 5a,b and 6a,b, the latch 38c has a protrusion 44 (that projects transversely (or otherwise outwardly) from the surface 62—see FIG. 3) with a lip 45 configured for engaging 72 (see FIG. 4) with the slot 38d (see FIG. 2). The protrusion 44 is coupled to the body 21 of the handle 20 by an arm 46 that has a resilient connection 48 (e.g. at a base 150 of the arm 46) to the body 21. For example, the resilient connection 48 can be configured as integrally connected with the material of the body 21 with a slit 80 between the body 21 and the arm 46 on either side 152 of the arm 46. Another example of the resilient connection 48 is a button 47 on the arm 46 and spring 49 interposed between the button 47 and the arm 46, see FIG. 7. The positioning of an abutment surface 55, further described below, restricts travel 57 of the arm 46 (in a gap 59 between the arm 46 and the body 21) during engagement 72 of the latch 38c with the corresponding slot 38d. It is recognised that other resilient connection 48 configurations can be used for the latch 38c, as apparent to one skilled in the art.

The slits 80 in the wall 84 of the body 21 on either side 152 of the arm base 150 can be varied in length and/or separation distance with respect to one another so as to facilitate the configuration of a degree of resiliency of the resilient connection 48. For example, a distance between the ends of the slits adjacent to the base 150 can facilitate the degree of resiliency of the resilient connection. Further, the slits 80 can be arcuate in shape along their length.

Figure 6A:
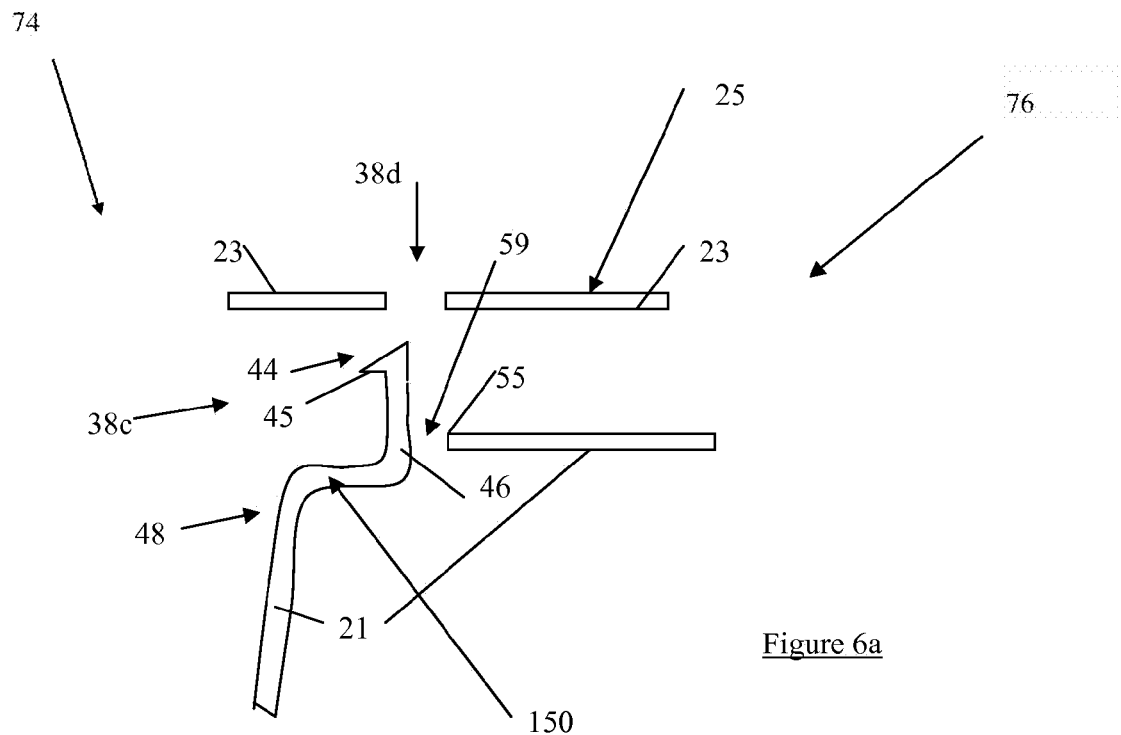
FIG. 6a shows an example latch configuration section A-A view of FIG. 5a as a releasable coupling between the handle and the terminal of FIG. 1.
Figure 6B:
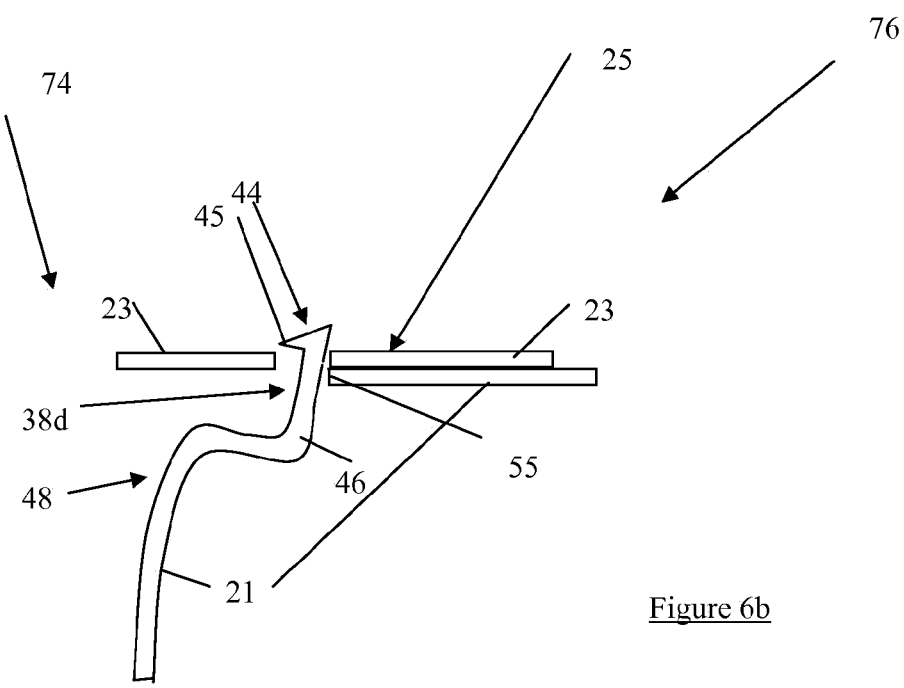

Referring again to FIGS. 6a,b, the resilient connection 48 is used to bias the latch 38c towards a first position 74 (see FIG. 6a by example) as compared to a second position 76 (see FIG. 6b by example), whereby positioning of the latch 38a towards the abutment surface 55 in the second position 76 facilitates engagement 72 of the protrusion 44 with the slot 38d while positioning of the latch 38a away from the abutment surface 55 of the first position 74 facilitates the retention of the protrusion 44 in the slot 38d via the interaction between the lip 45 and the inside surface 25 of the slot 38d, once engaged 72 and until removed 72. For example, FIG. 6a shows the position of the latch 38c in the first position 74 and external/unengaged with the slot 38d, while FIG. 6b shows the position of the latch 38c in the second position 76 (towards the abutment surface 55) and internal/engaged with the slot 38d.

Subsequent release of the latch 38c by the user results in displacement 57 of the latch 38c away from the abutment surface 55 and then contact occurs with the arm 46 with a side of the slot 38d, thus providing for a releasably secure engagement 72 of the handle 20 with the enclosure 23, until the latch 38c is subsequently displaced 57 towards the second position 76 and the protrusion 44 is removed 72 from the slot 38d to provide for detachment of the handle 20 from the enclosure 23 (e.g. such that the lip 45 of the protrusion 44 is disengaged from the inside surface of the enclosure 23, thus facilitating the removal of the proximal surface 62 away from the adjacent surface 64.

In view of the above, it is recognised that the above example operation of the latch 38c with the slot 38d can be done before the protrusions 38b are inserted into the slots 38a (e.g. the engagement 72 is performed before the engagement 70—see FIG. 4) or as shown such that the engagement 70 is performed before the engagement 72. As well, it is recognised that the latch(es) 38c could be in the location of the protrusions 38b and the protrusion(s) 38b could be in the location of the latch(es) 38c, as desired. For example, the protrusions 38b are located on either side of the depression portion 63 of the proximal portion 50, so as to engage with the corresponding slots 38a on either side of a portion of the enclosure 23 housing the communications module 34 (e.g. protruding portion 64a). Further, the location of the latches 38c and/or the protrusions 38b could be located other than as shown (e.g. on opposing sides 78—see FIG. 3) of the proximal portion 50 as compared to opposing ends 79 of the proximal portion 50.

Accordingly, provided is the handle 20 for the portable computer 10 having one or more scanning functions for interacting with information objects 16 in the logistics environment 18. The handle 20 is releasably secured with the housing 23 of the portable computer 10 such that once attached, the handle 20 facilitates directional pointing of the portable computer 10 by the user. The handle comprises the handle body 21 having the grip portion 54 shaped for grasping by the hand of the user of the portable computer 10, the proximal end 50 of the grip portion 54 for coupling to the housing 23 of the portable computer 10 such that the proximal end 50 having the proximal surface 62 for mating with the adjacent surface 63 of the housing 23, and the distal end 52 of the grip portion 54. The handle also has the actuator assembly 43 for affecting the operation of the one or more scanning functions and is located in the grip portion 54 of the handle body 21, the actuator assembly 43 for coupling via the control coupling 40 to one or more components 19 of the portable computer 10 providing the one or more scanning functions. The handle also has the releasable connection mechanism 38 positioned on the proximal surface 62 including the operable latch 38c extending outwardly from the proximal surface 62 and adapted for engaging with the corresponding first slot 38d in the adjacent surface 63 of the housing 23, and at least one protrusion 38b extending outwardly from the proximal surface 62 on a side 78,79 of the proximal surface 62 opposite (e.g. opposed to) to the operable latch 38c and adapted for engaging with the corresponding second slot 38a in the adjacent surface 63 of the housing, wherein the control coupling 40 is established once the proximal surface 62 is mated with the adjacent surface 63 through engagement of the releasable connection mechanism 38.

It is recognised that in view of the above, the depression portion 63 is shaped to accommodate the corresponding protruding portion 64a on the adjacent surface 64 of the housing 23. For example, the handle 20 can have a pair of the protrusions 38b, such that one of the pair of the protrusions 38b is located on either side of the depression portion 63 and the adjacent surface 64 has a corresponding pair of the second slots 38a located on either side of the protruding portion 64a of the housing 23. Alternatively, the handle 20 can comprising a pair of the slots 38a, such that one of the pair of the slots 38a is located on either side of the depression portion 63 and the adjacent surface 64 has a corresponding pair of the protrusions 38b located on either side of the protruding portion 64a of the housing 23. Alternatively, the handle 20 can have one slot 38a and one protrusion 38b on either side of the depression portion 63 and the enclosure can have a corresponding configuration of one protrusion 38b and one slot 38a, as desired. Further, it is recognised that the surface of the depression portion 63 can have a protrusion 38b for engaging with a corresponding slot 38a located on the protruding portion 64a of the enclosure 23. Further, it is recognised that the surface of the depression portion 63 can have a slot 38a for engaging with a corresponding protrusion 38b located on the protruding portion 64a of the enclosure 23.

Stylus 90

Figure 8:
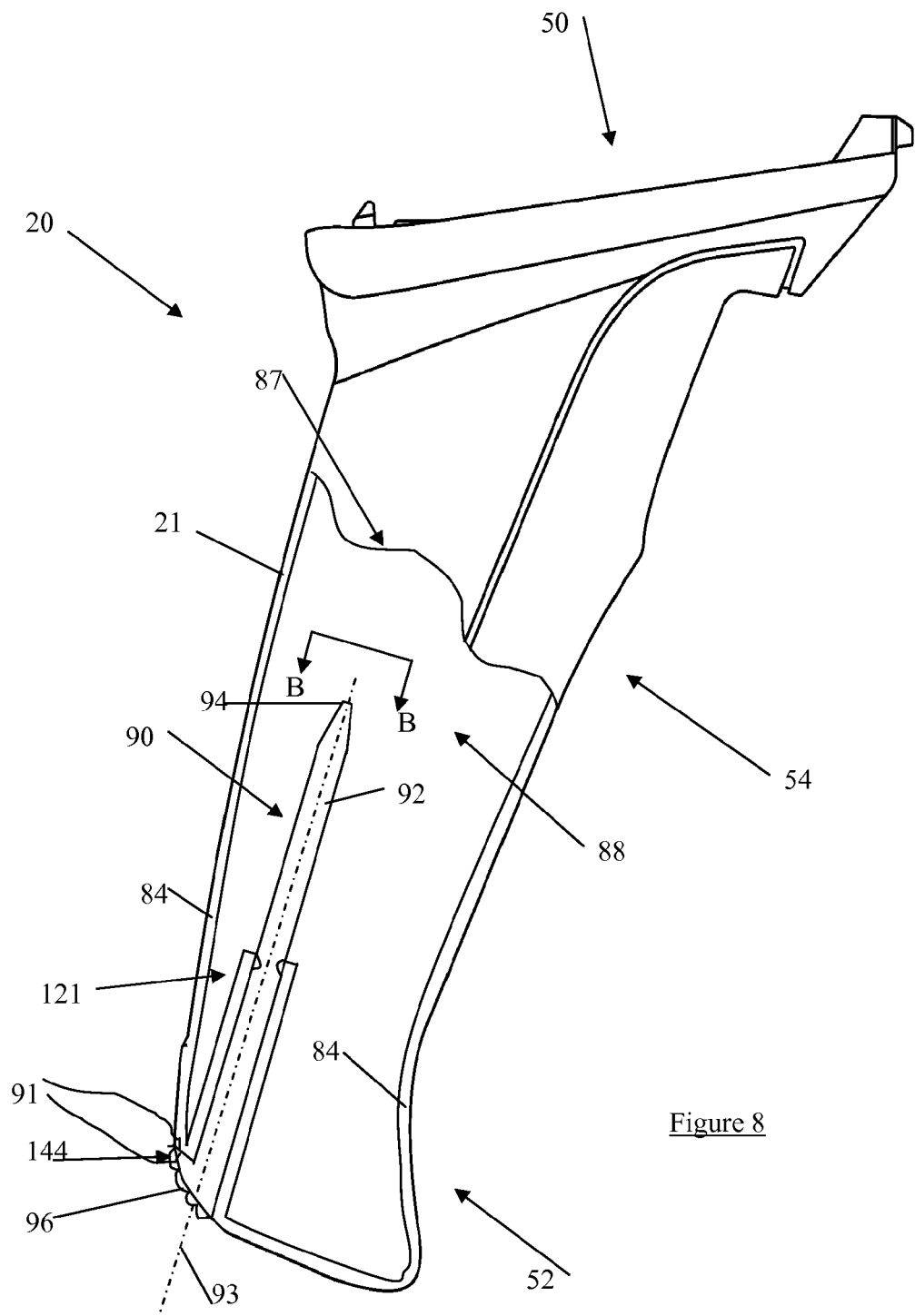
FIG. 8 shows an example assembled stylus configuration of the handle of FIG. 1.

Referring to FIGS. 5a and 8, shown is a stylus 90 housed/stored in an interior 88 of the walls 84 of the handle 20 (shown by cut away portion 87), for use as part of the user interface 26 (see FIG. 1) of the computer 24. The stylus can have an arcuate tip 94 (e.g. rounded) at one end, a narrow elongated portion 92 (e.g. body), similar to a ballpoint pen or other traditional writing instrument, and a textured portion 96 at the other end that is configured for grasping by the user of the portable terminal 10 (see FIG. 1). The textured portion 96 can be arcuate in shape or otherwise have a surface 144 that is oriented at an acute angle with respect to a longitudinal axis 93 of the receptacle 106, thereby facilitating removal of the stylus 90 from the receptacle 106 through pressure exerted by the user's finger(s) and/or thumb.

The stylus 90 is used as an input method of the user interface 26, such that the stylus 90 may not secrete ink, rather is configured to touch a touch screen (e.g. the display 30) instead of the user's finger to help inhibit getting the natural oil from the user's hands onto the display 30. The stylus 90 can also be configured so that the tip 94 is shaped so as to help improve precision of touch with the display 30, thus providing for the presence of smaller interface elements on the display 30. The stylus 90 can be configured for handwriting or drawing on the display 30 by the user. Positioning of the stylus 90 in the interior 88 of the handle 20 facilitates ease of storage until subsequently released from the interior 88 of the handle 20 of the terminal 10 for subsequent use by the user with the user interface 26 (see FIG. 1).

Figure 9A:
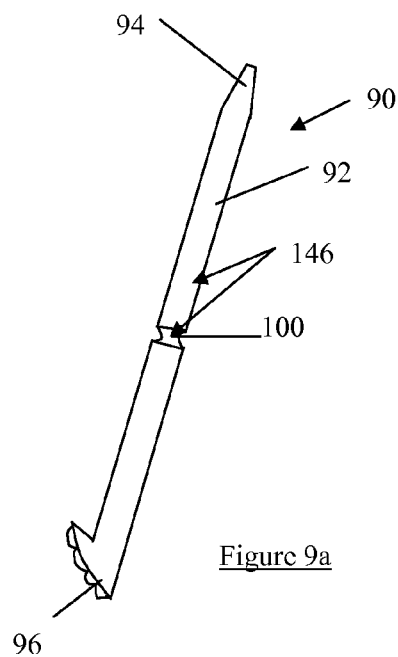
FIG. 9a shows an example stylus of the stylus configuration of FIG. 8.

Referring to FIGS. 9a,b, the elongated portion 92 has one or more notches and/or grooves 100 configured for receiving one or more protrusions 102 located on one or more resilient arms 104 of the body 21. The arms 104 can be configured so as to be independently operable, so as to become displaced to either side of the stylus 90, once inserted 108 into (see FIG. 11—or otherwise removed 108 from) the receptacle 106 coupled to a wall 84 of the body 21. The receptacle 106 has a proximal opening/aperture 116 for receiving the tip 94 of the stylus, a body 115 for contacting a side surface 146 (e.g. the notches and/or grooves 100) of the elongated portion 92 of the stylus 90 for facilitating retention of the stylus 90 in the receptacle 106, and a distal end 114 of the arms 104. The distal end 114 may be open or closed, as long as the arms 104 are independently operable with respect to one another. The receptacle 106 is shown located at the distal end 52 of the handle 20, by example only, and provides for access and storage of the stylus 90 in the interior 88 of the handle 20. It is recognised that the receptacle 106 can also be located in the grip portion 54 of the body 21, as desired.

The notch 100 can extend around at least a portion of a cross-sectional periphery of the exterior surface of the stylus 90 and the corresponding protrusion 102 can extend around at least a portion of the interior surface of the member 104 of the receptacle 106. For example, the notch 100 can be a groove extending around the circumference of the stylus 90. Further, the arms 104 can be referred to as members 104. The member 104 as an arm 104 can have a proximal end 142 connected to a distal end 140 by a central portion 144 (see FIG. 10b for example) and the biasing of the arm 104 is due to a resiliency of the material composition of the arm 104 as connected at the proximal end 142 to the body 21. For example, the arm 104 is rigidly connected at the proximal end 142 to the handle body 21 and the distal end 140 is adapted to be displaced away 112 from an exterior surface of the stylus 90 when received in the receptacle 106.

Figure 11:
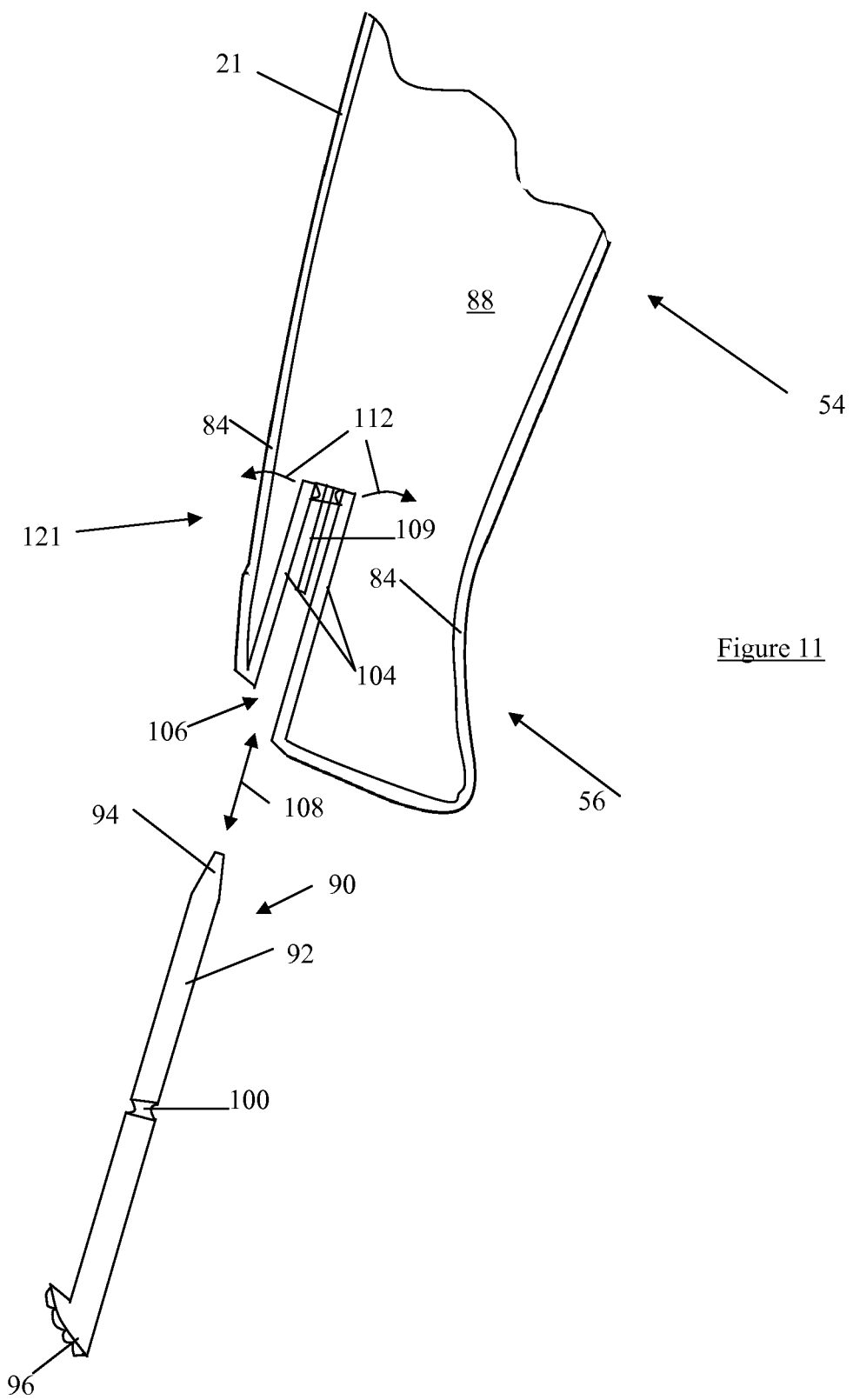
FIG. 11 shows an disassembly of the stylus configuration of FIG. 8.

Referring to FIGS. 8 and 11, the resilient arms 104 are used to bias the body 115 towards a first position 121, as compared to a second position 122 (see FIG. 12 by example), whereby inserting the stylus 90 from the proximal end 116 towards the distal end 114 facilitates engagement 72 of the protrusions 102 with the notches and/or grooves 100, thereby displacing 112 the arms 104 from the first position 121 to the second position 122 and then back to the first position 121. Positioning of the arms 104 in the first position 121, when the stylus 90 is present in the receptacle 106, facilitates the retention of the stylus 90 in the receptacle 106 via the engagement of the protrusions 102 in the notches/grooves 100, until removed therefrom via subsequent displacement 112 of the arms 104.

Figure 9B:
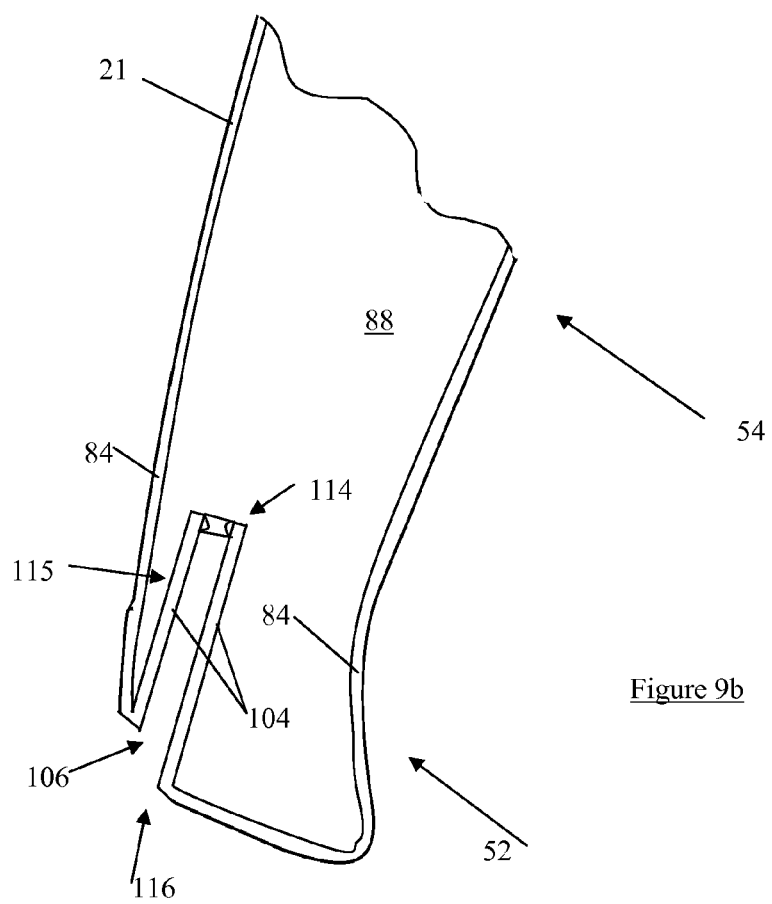
Figure 9C:
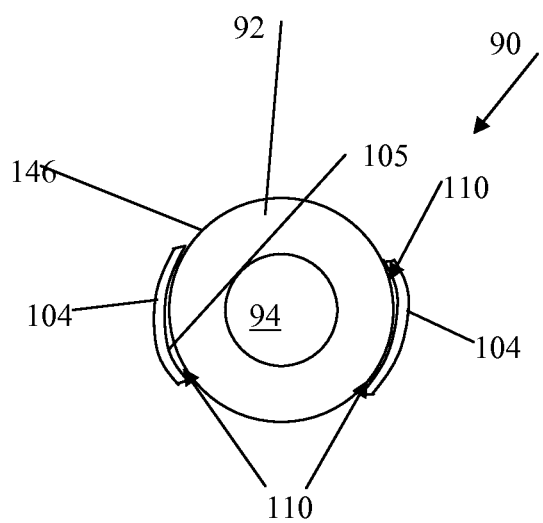
FIG. 9c shows a top section view B-B of the receptacle of FIG. 8.
Figure 9D:
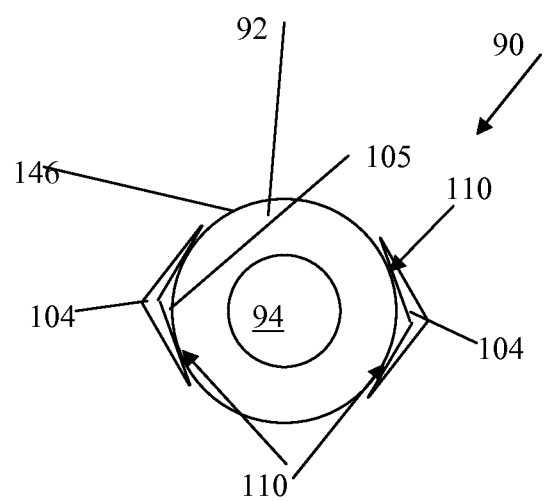
FIG. 9d is an alternative embodiment of the receptacle of FIG. 9c.

Referring to FIGS. 9c,9d, shown are example embodiments of an end view B-B of the arms 104, at any desired location(s) 110 along the elongated portion 92 of the stylus 90, such that an interior surface 105 of the arms 104 is shaped (e.g. arcuate) so as to contact an exterior surface 146 of the stylus 90 at two or more locations 110 along exterior surface 146, thus facilitating contact between the arms 104 and the stylus 90. It is also recognised that the contact at the multiple locations 110 can also be provided by multiple sets of protrusions 102 received in corresponding notches and/or grooves 100, in addition to, in combination with, and/or in substitution of the correspondingly shaped surfaces 146,105.

Figure 10A:
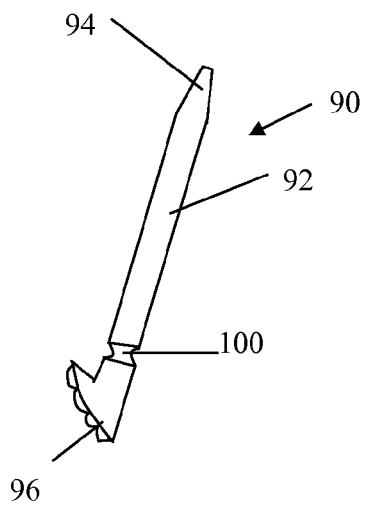
Figure 10B:
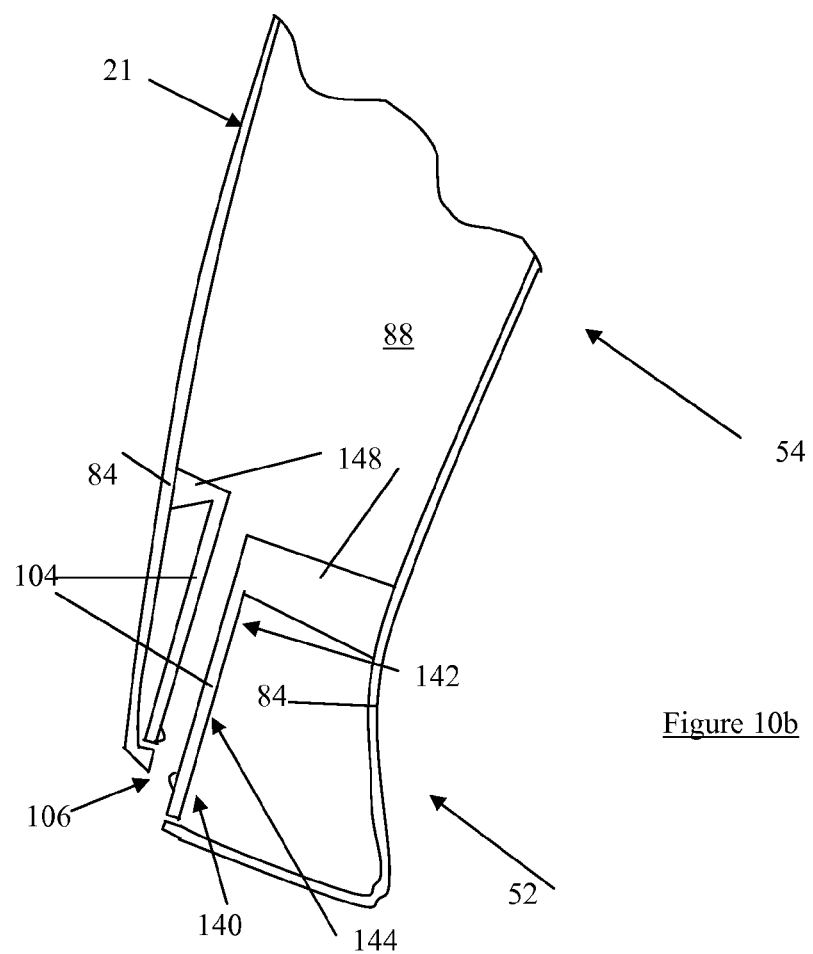
FIG. 10b is an alternative embodiment of the receptacle of FIG. 9b.

The arms 104 are connected to or are otherwise extensions of the wall 84. Referring to FIGS. 10a,b, it is recognised that the arms 104 could be alternatively connected to the walls 84 using secondary connections 148, as desired, and the notches 100 can be located on one or more of the arms 104, can be located in the same or different (shown in FIG. 10b) locations on each of the arms 104, and/or be configured as connected directly to the wall 84, as desired.

Referring again to FIG. 11, shown is the stylus 90 located externally to the interior 88, prior to insertion 108. The arms 104 are formed from a tube shaped receptacle 106, by example only, with one or more slots 109 cut into the tube wall at the distal end 114 of the tube, so as to provide for the two or more arms 104 operable 112 with respect to once another, i.e. the arms 104 are resilient so as to accommodate the cross sectional extent of protrusions 102 prior to being received in the notches and/or grooves 100. As the stylus 90 is travels along the body 115 of the receptacle 106, contact between the elongated portion 92 of the stylus 90 and the protrusions 102 causes the resilient arms 104 to increase in separation distance (see FIG. 12) with respect to one another in order to accommodate the elongated portion 92 being positioned between the opposing protrusions 102 of the adjacent arms 104. Further insertion 108 of the stylus 90 into the receptacle causes the protrusions 102 to become received in the notches/grooves 100, thus returning the arms 104 from the second position 122 to the first position 121.

Figure 12:
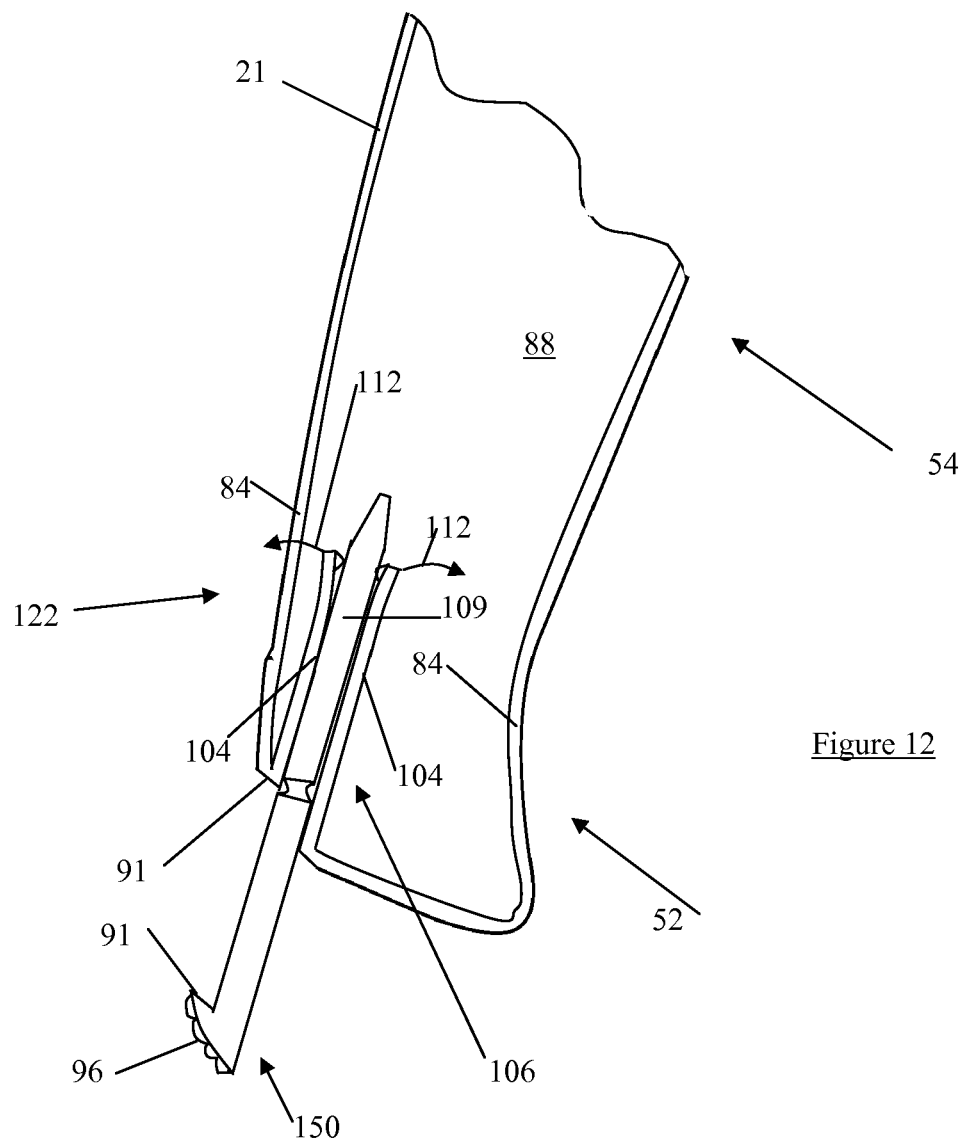
FIG. 12 shows a partial assembly of the stylus configuration of FIG. 8.

Further, for example, for removal once the stylus 90 is engaged (i.e. retained) within the receptacle 106, FIG. 8 shows the position of the arms 104 in the first position 121 and the stylus retained within the receptacle 106, via engagement of the protrusions 102 with the notches/grooves 100. FIG. 12 shows the increase in separation distance between the arms 104, i.e. in the second position 122 as displaced 112 away from the surface 146 of the elongated portion 92 of the stylus 90, as the protrusions 102 become disengaged with the notches/grooves 100. Subsequent removal 108 of the stylus 90 from the receptacle 106 causes the arms 104 to return to the first position 121 as shown in FIG. 11, thus releasing the stylus 90 from the handle 20 of the terminal 10 for subsequent use by the user with the user interface 26 (see FIG. 1). Further, referring to FIGS. 9b and 12, a proximal end 150 of the stylus 90 can have an abutment surface 91 for contacting a corresponding abutment surface 91 of the body 21 of the handle 20, as desired, the abutment surfaces 91 for restricting a magnitude of displacement of the stylus 90 into the receptacle 106.

Figure 13:
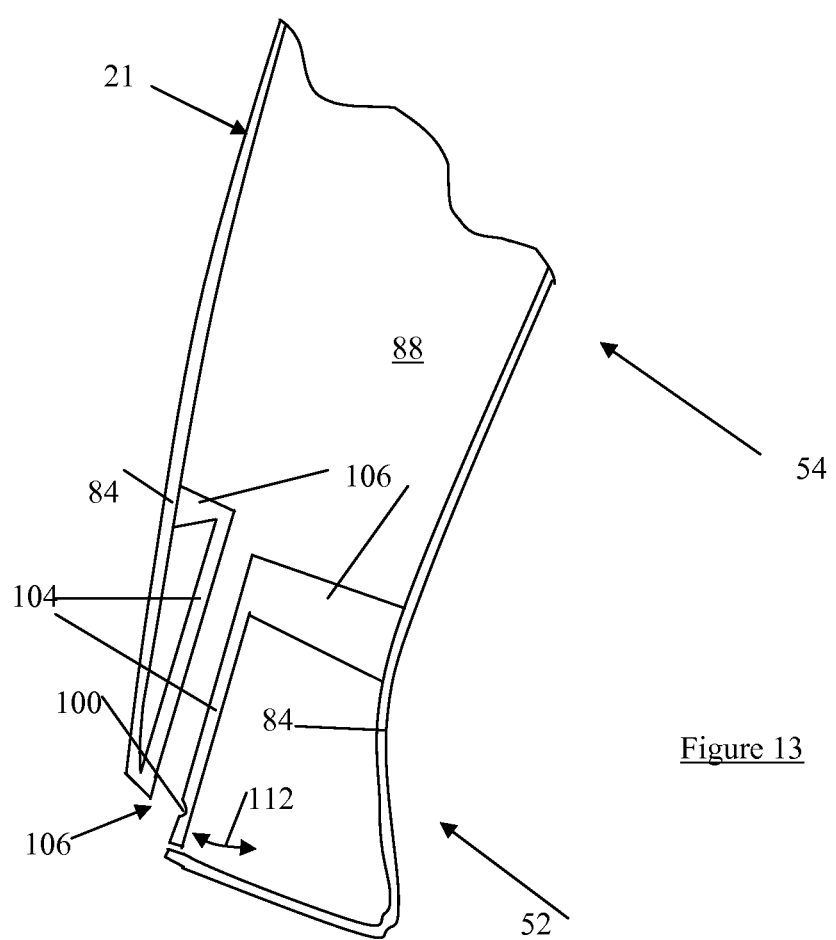
FIG. 13 is an alternative embodiment of the receptacle of FIG. 9b.

Referring to FIG. 13, it is also recognised that one of the arms 104 can be fixed (i.e. rigid) in position relative to one or more resilient second arms 104, such that displacement 112 of the resilient arm(s) 104 provides for an increase in the separation distance between the arms 104, thus facilitating the engagement of the protrusions 102 with the notches/grooves 100. It is also recognised that the body 115 of the receptacle 106 can be configured to include only one resilient arm 104 that is biased with respect to the wall 84 of the body 21, thus facilitating the retention of the stylus 90 between the one arm 104 and the wall 84 (and/or other rigid secondary structures 106 of the body 21). It is also recognised that the notches/grooves 100 can be positioned in the arm(s) 104 and the protrusions 102 can be positioned on the elongated portion of the stylus 90, so long as the protrusions 102 can be inserted through the proximal end 116 of the receptacle 106. It is also recognised that the notches 100 also refer to holes in a wall of the stylus 90 having a hollow core (not shown) of the elongated portion 92, for example, and/or in as a hole in the arm(s) 104, as desired.

In view of the above description of the protrusions 102 and corresponding notches/grooves 100, it is recognised that the arms 104 and the corresponding stylus 90 can be configured using any of the configurations of same, shown by example in FIGS. 9-15.

Accordingly, as described above, a handle 20 is given for a portable terminal 10 having a user interface 26 configured for interaction with the stylus 90, the handle 20 comprising: the handle body 21 having the grip portion 54 shaped for grasping by the hand 140 of the user of the portable terminal 10, the proximal end 50 of the grip portion 54 for coupling to the housing 23 of the portable computer 10, and the distal end 52 of the grip portion 54; the receptacle 106 connected to the handle body 21 and located in the interior 88 of the handle body 21, the receptacle 106 adapted for releasably retaining the stylus 90 in the interior 88 of the handle body 21, the handle body 21 having an aperture for facilitating access of the stylus 90 into the receptacle; and at least one member 104 (e.g. arm) of the receptacle 106 having a first shaped feature (e.g. protrusion 102 and/or notch/groove 100) adapted for engaging a second shaped feature (e.g. corresponding notch/ groove 100 and/or protrusion 102) of the stylus 90 for providing the releasable retaining of the stylus 90 when resident in the receptacle 106, the member 104 biased towards a first position 121 for facilitating the engagement of the first shaped feature (e.g. protrusion 102 and/or notch/groove 100) with the second shaped feature (e.g. corresponding notch/groove 100 and/or protrusion 102).

Alternatively the handle 20 can include the handle body 21 have the releasable connection mechanism 38 positioned on the proximal surface 62 including the operable latch 38c extending outwardly from the proximal surface 62 and adapted for engaging with the corresponding first slot 38d in the adjacent surface 64 of the housing 23, and at least one slot 38a on the side 78,79 of the proximal surface 62 opposite to the operable latch 38c and adapted for engaging with the corresponding protrusion 38b extending outwardly from the adjacent surface 64 of the housing 23; wherein the control coupling 40 is established once the proximal surface 62 is mated with the adjacent surface 64 through engagement of the releasable connection mechanism 38.

Alternatively, the handle 20 can include the handle body 21 the releasable connection mechanism 38 positioned on the proximal surface 62 including the first slot 38d for engaging with the corresponding operable latch 38c extending outwardly from the adjacent surface 64, and at least one protrusion 38b extending outwardly from the proximal surface 62 on the side 78,79 of the proximal surface opposite/opposing to the first slot 38d and adapted for engaging with the corresponding second slot 38a on the adjacent surface 64 of the housing 23; wherein the control coupling 40 is established once the proximal surface 62 is mated with the adjacent surface 64 through engagement of the releasable connection mechanism 38.

Alternatively, the handle 20 can include the handle body 21 the releasable connection mechanism 38 positioned on the proximal surface 62 including the first slot 38d for engaging with the corresponding operable latch 38c extending outwardly from the adjacent surface 64, and at least second slot 38a of the proximal surface 62 on the side 78,79 of the proximal surface opposite/opposing to the first slot 38d and adapted for engaging with the corresponding protrusion 38b extending outwardly from the adjacent surface 64 of the housing 23; wherein the control coupling 40 is established once the proximal surface 62 is mated with the adjacent surface 64 through engagement of the releasable connection mechanism 38.

Actuator Assembly 43

Referring again to FIG. 2, the actuator assembly 43 is configured for affecting the operation of one or more of the components 19 of the computer 24 via the instruction/control signals 42 generated through physical interaction (e.g. depressing of the trigger from a first position to a second position) of the user with the actuator assembly 43. As is shown by example, the grip portion 54 has the resilient covering, for example, portion 56, preferably made of a resiliently flexible material, for enhancing the grip of the user's hand on the body 21 of the handle 20. The actuator assembly 43 (shown in dotted lines underneath the resilient covering 56) has a raised portion 58 on a face portion 58, for facilitating user identification of the actuator assembly 43 underneath the overmold 56. The raised portion 58 projects in a direction transverse or otherwise extending outwards from the surface of the grip region 54, and can be optionally covered by the resilient covering 56.

The resilient covering 56 can be used to cover a gap 131 (see FIG. 14) between an actuator body 120 and an opening or aperture 133 of the adjacent wall 84, in which the actuator body 120 is positioned, so as to inhibit foreign matter (e.g. water) penetration into the interior 88 of the body 21. It is also recognised that the resilient covering 56 can only be adhered to the body 21 of the handle and not to the actuator body 120, thus providing for unhindered actuation/displacement of the actuator body 120 with respect to the handle body 21. Otherwise, in the case where the resilient covering 56 is also adhered to exterior surfaces 138 of the actuator body 120 and the handle body 21, the resilient covering 56 material is sufficiently resilient/elastic in nature to provide for corresponding actuation/displacement of the actuator body 120 with respect to the handle body 21, in order to result in sufficient switching of the switch 134 by a control arm 132 (see FIG. 14), when the actuator assembly 43 is displaced into the interior 88 of the handle body 21 from the first position to the second position. Accordingly, the switch 134 is mounted in the interior 88 of the handle body 21, such that the switch 134 facilitates generation of the control signal 42 for affecting the operation of the one or more scanning functions of the portable terminal 10, the switch 134 operated as a result of the actuator body 120 being displaced from one of the first and second positions to the other of the first and second positions.

Alternatively, or in addition, the resilient covering 56 can have an indicator section 60 for indicating to the user the location of the actuator assembly 43 on the grip portion 54 underneath the resilient covering 56. The indicator section 60, can have a material texture, colour, and/or shading different from other material of the resilient covering 56 and/or can have a label identifying the location of the actuator body 120 underneath the resilient covering 56. Accordingly, the indicator section 60 can be use by the user to help identify the actuator assembly 43 region of the handle 20 from the remainder of the grip region 54, which can be beneficial in inhibiting accidental actuations of the actuator assembly 43. Inhibiting of accidental actuations can be desirable in view of conserving battery 36 life as well as reducing exposure of the environment 18 (see FIG. 1) to the wireless communications 14 (e.g. laser).

Figure 14:
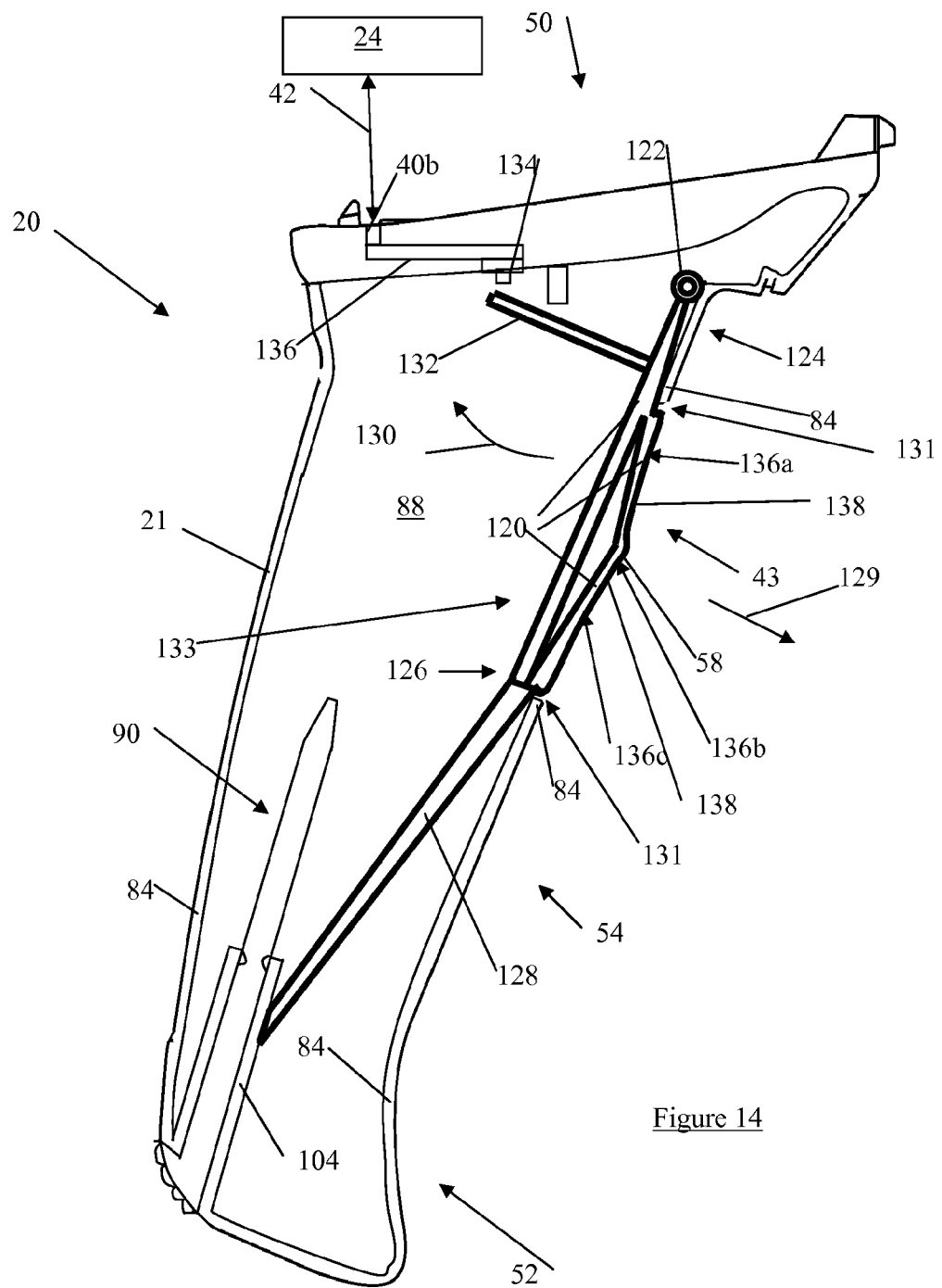
FIG. 14 shows an example actuation assembly of the handle of FIG. 1.

Referring to FIG. 14, shown is the example actuator assembly 43 with the resilient covering 56 and exterior shell of the body 21 removed to show the interior 88 of the handle 20. The actuator assembly 43 has the actuator body 120 connected to the body 21 at a proximal end 124 by a pivot point 122 (e.g. hinge with an optional biasing member such as a coiled spring, etc.) and at a distal end 126 to a member 128 (e.g. a biasing member such as a spring). The biasing member(s) are configured for biasing the actuator body 120 towards an unactivated/unactuated position 129 (e.g. the first position at which the control signals 42 are not generated). The member 128 is also connected to the body 21 (e.g. the arm 104). Depression of the actuator body 120 in a direction 130 in to the interior 88 of the body 21, about the pivot point 122, from the biased position 129 causes the control arm 132 (connected to the actuator body 120) to activate/depress the switch 134 when the actuator assembly 43 is displaced into the second position. Activation of the switch 134 generates the control signals 42, or otherwise causes a circuit 136 (optional) to generate the control signals 42. The control signals 42 are communicated via the electrical contact 40b to the computer 24, when coupled to the handle 20 (see FIG. 1). The switch 134 and the optional circuit 136 are also mounted on the body 21 of the handle 20.

Figure 16:
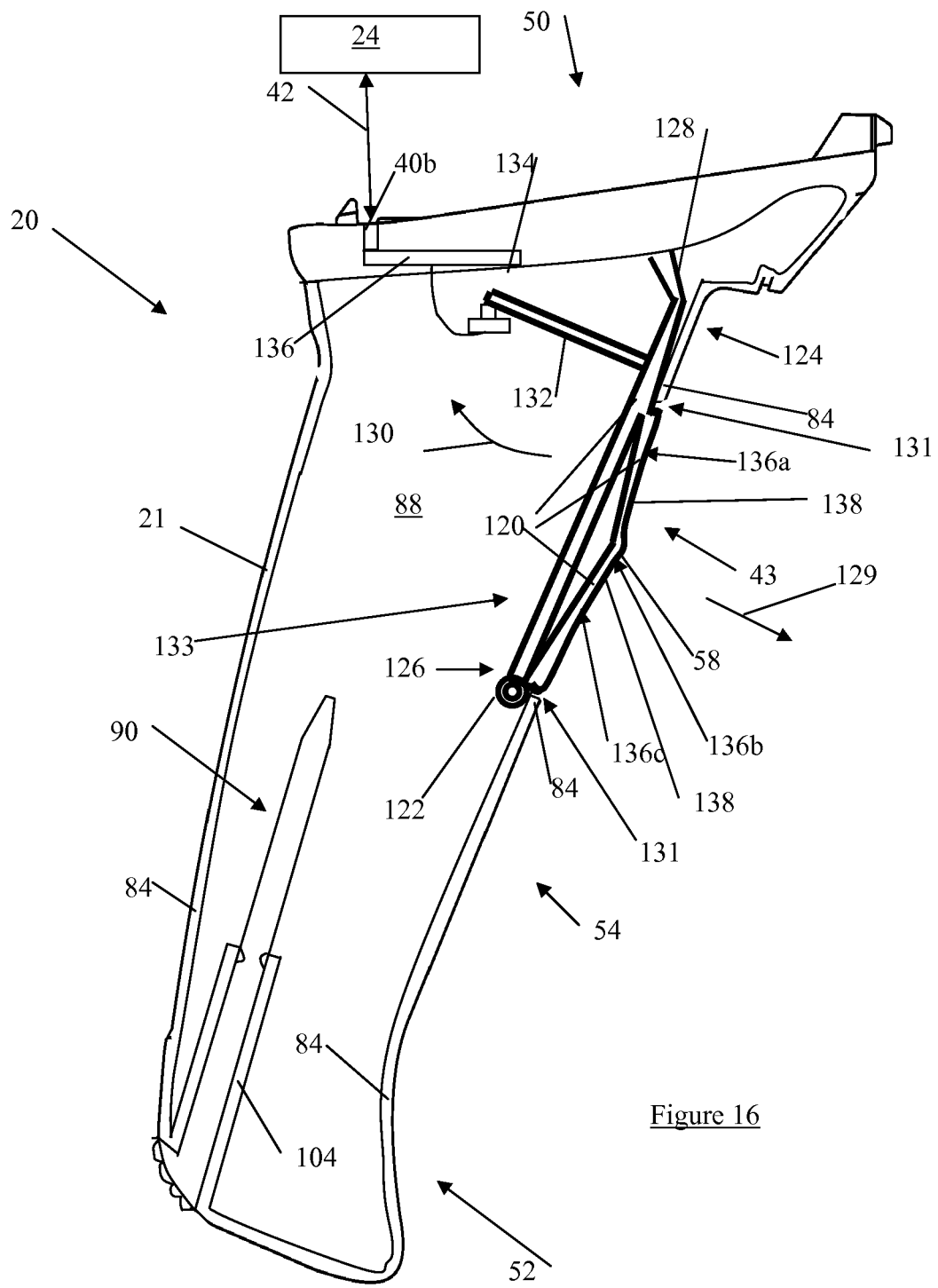
FIG. 16 shows an alternative embodiment of the actuator mechanism of FIG. 14.
Figure 17:
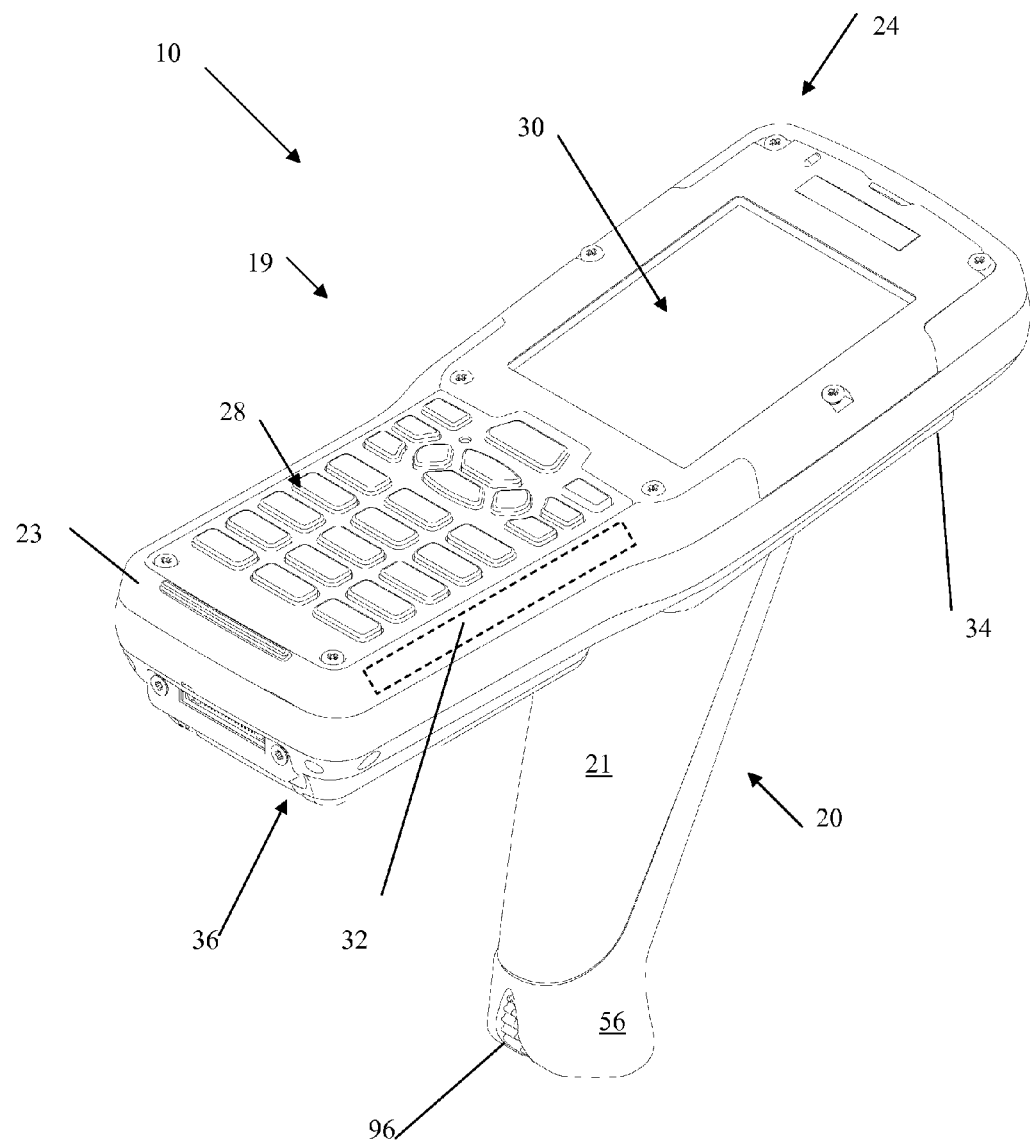
FIG. 17 is a top rear perspective view of the portable terminal of FIG. 1.
Figure 18:
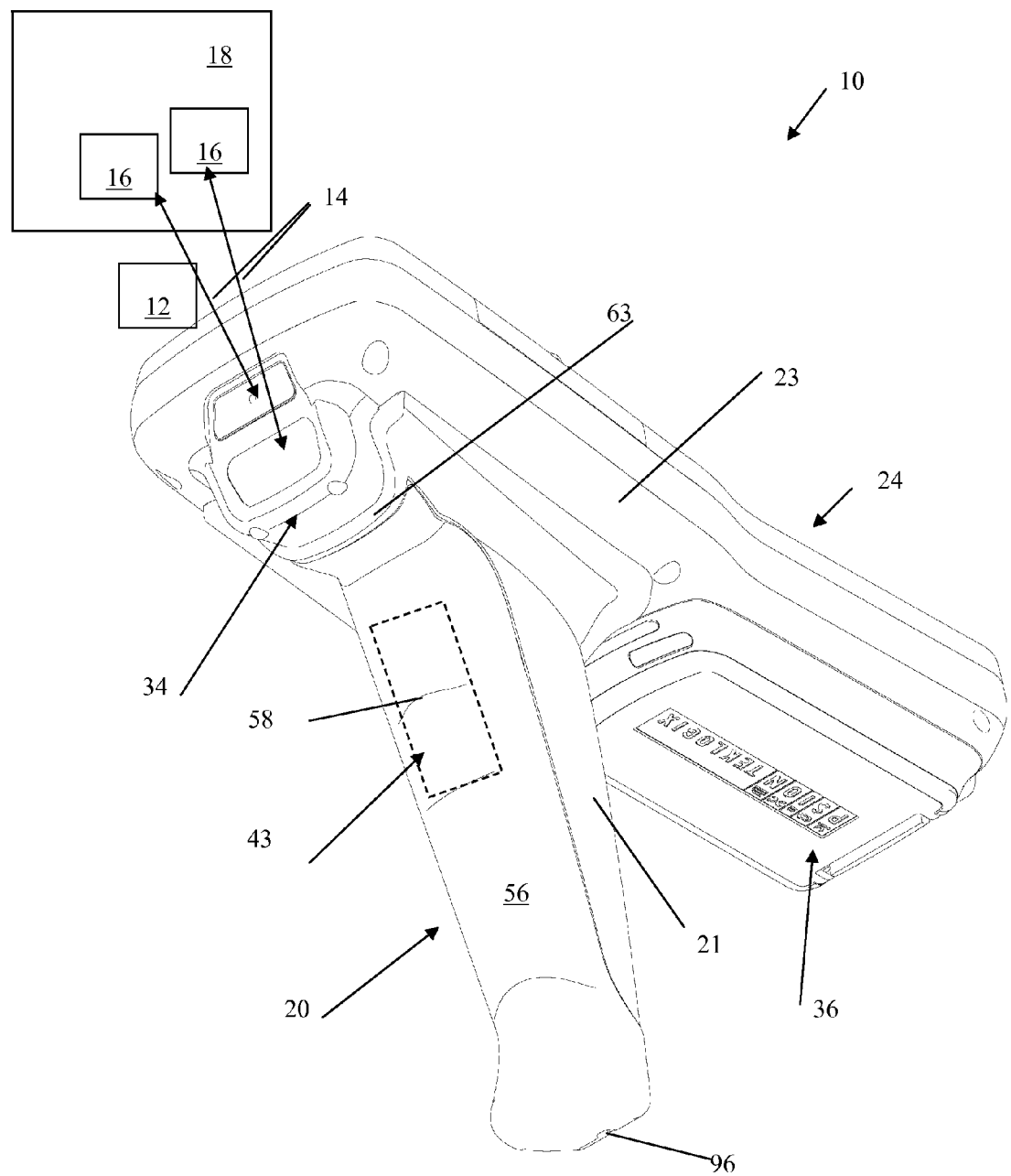
FIG. 18 is a bottom front perspective view of the portable terminal of FIG. 1.

Alternatively, referring to FIG. 16, the pivot point 122 can be located at the distal portion 126 of the actuator body 120 and the member 128 can be located at the proximal portion 124. Further, it is recognised that the pivot point 122 and/or the member 128 can be located at the respective end of the portions 124, 126 and/or can be located adjacent to the respective end of the portions 124, 126, as desired.

It is recognised that the first position can be the unactuated position and the second position can be the actuated position (i.e. of the switch) or the first position can be the actuated position and the second position can be the unactuated position (i.e. of the switch), as desired. Further, it is recognised that the biasing member(s) can bias the actuator body to either the first position or the second position, as desired.

Figure 15:
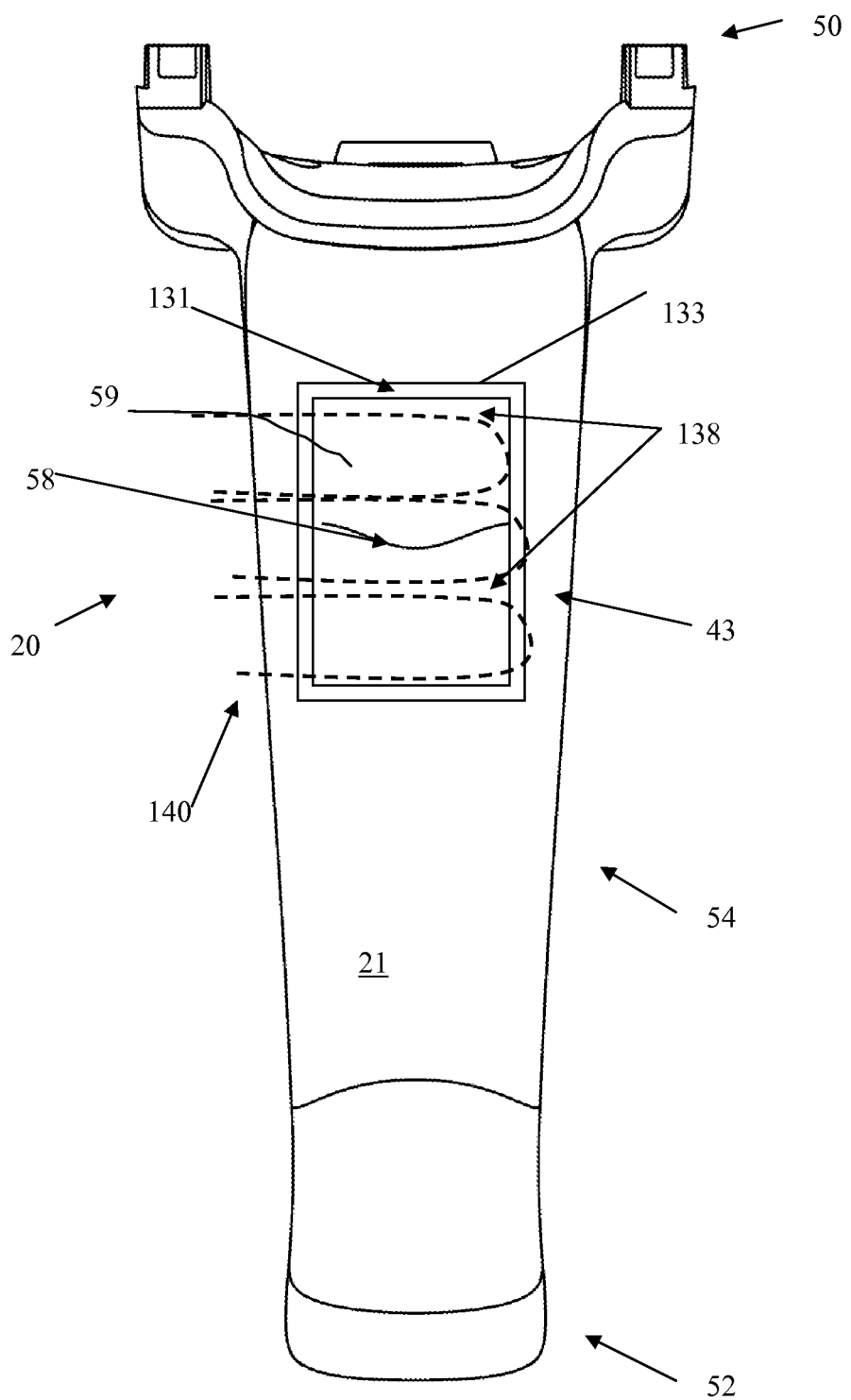
FIG. 15 shows a front view of the actuation assembly of FIG. 14.

Referring to FIGS. 14 and 15, the actuator body 120 has a plurality of trigger/actuation regions 136a,b,c for contact by the user's hand 140, in order to actuate the actuator mechanism 43. For example, the user can: put pressure on the actuator region 136c to cause the switch 134 to be depressed; put pressure on the actuator region 136b to cause the switch 134 to be depressed; and/or put pressure on the actuator region 136a to cause the switch 134 to be depressed, as described above. Once the actuator body 120 is released by the user's hand 140, the biasing member(s) (e.g. member 128 and/or 122) moves the actuator body 120 back towards the unactivated/unactuated position 129.

The actuator body 120 is shaped so as to provide for these different trigger regions 136a,b,c, either alone or in combination. For example, the trigger region 136a of the body 120 can start adjacent at one end (e.g. substantially flush with— e.g. the surfaces 138 at the ends of the actuator body 120, that are adjacent to the exterior surface of the handle body 21, are substantially parallel to one another) to the wall 84 of the body 21 and then incline/rise to towards the raised portion/point 58 at the other end. The trigger region 136c of the body 120 can start adjacent at one end (e.g. substantially flush with) to the wall 84 of the body 21 and then incline/rise to towards the raised portion/point 58 at the other end. The trigger region 136b can be positioned at the raised portion/point 58. In this manner, the trigger portions 136a,c are connected to one another at the raised portion/point 58 and their outside surfaces 138 can be oriented at an obtuse angle (any angle more than 90° but less than 180°) as measured between the outside surfaces 138 of the face portion 59. It is also recognised that the pivot point 122 can be positioned at the end 126 and the biasing member 128 at the other end 124, such that the switch 134 is configured to be activated when any of the trigger regions 136a,b,c are depressed.

Further, it is recognised that one or more of the actuator regions 136a,b,c can be actuated at any one time by the user's hand 140 (e.g. one finger can contact the actuator region 136c, one finger can contact the actuator region 136b, one finger can contact the actuator region 136a, one finger can contact the actuator region 136c together with another finger contacting the actuator region 136b, one finger can contact the actuator region 136a together with another finger contacting the actuator region 136b, one finger can contact the actuator region 136a together with another finger contacting the actuator region 136c, or one finger can contact the actuator region 136c together with another finger contacting the actuator region 136b together with another finger contacting the actuator region 136a).

It is recognised that the configuration of the raised portion 58 and the surfaces 138 of the face portion 59 of the actuator body 120 can be as described above as well as in other configurations. The one embodiment described is where the first inclined surface 138 and the second inclined surface 138 of the face portion 59 are configured such that the first inclined surface 138 rises from one end of the face portion 59 to the raised portion 58 and the second inclined surface 138 rises from the other end of the face portion 59 to the raised portion 58, such that the raised portion 58 is positioned between the ends of the face portion 130. Another configuration is where the inclined surface rises from one end of the face portion 59 to the raised portion 58 located at the other end of the face portion 59, such that there is only on inclined surface 138 of the actuator body 120.

Further, the inclined surfaces 138 can be planar and/or arcuate in shape. In the case of arcuate inclined surfaces 138, they can be concave for providing a contoured surface for interaction with the one or more fingers of the user's hand 140.

In view of the above, it is recognised that manipulation of any of the trigger regions 136a,b,c, either alone or on combination, provides the same movement 130 of the actuator body 120 about the pivot point 122 and thus provides a same/ similar tactile feel to the user each time the switch 134 is activated. Further, it is recognised that the ends of the trigger regions 136a,c can be as shown (e.g. flush with the adjacent wall 84 of the body 21), or can be raised (e.g. at a different height) with respect to the adjacent wall 84 of the body 21 to further denote the presence of the actuator body 120 under the overmold 56, as desired.

Other Features

Referring to FIG. 2, also shown is an expansion cover 140 for use in positioning 143 in a correspondingly shaped depression 142 surrounding the electrical contacts 40a, when the handle 20 is not connected to the enclosure 23. When the handle 20 is to be connected to the enclosure 23, the expansion cover 140 is removed from the depression 142, thus exposing the electrical contact 40a (and the slot 138d), and then stored in a similarly shaped depression 144 in the proximal end 50 of the handle 20 (see FIG. 3). Connection of the handle 20 to the enclosure 23 provides for the expansion cover 140 to be retained between the handle 20 and the enclosure 23 until the handle 20 is once again detached from the enclosure 23 and the expansion cover 140 is replaced in the depression 142. The expansion cover 140 is used to inhibit foreign matter (e.g. water) penetration into the interior of the body enclosure, via the slot 38d, and/or fouling of the electrical contact 40a, when the handle 20 is not connected/ coupled to the enclosure 23.

Therefore, as further described below, the handle 20 is configured for connection to the enclosure 23 of the portable terminal 10, such that the portable terminal 10 has one or more scanning functions for interacting with information objects 16 in the logistics environment 18. The handle 20 has the handle body 21 having the grip portion 54 shaped for grasping by the hand 140 of the user of the portable terminal 10, the proximal end 50 of the grip portion 54 for coupling to the housing 23 of the portable terminal 10, and the distal end 52 of the grip portion 54. The actuator assembly 43 is configured for affecting the operation of one or more scanning functions and is positioned in the aperture 133 of the handle body 21 for access by one or more fingers of the user's hand 140. The actuator assembly 43 includes the actuator body 120 connected at a proximal portion to the handle body 21 by the pivot connection 122, the biasing member(s) for biasing the actuator body 120 towards the first position, and the face portion 59 of the actuator body 120 configured for contacting with the one or more fingers such that the face portion 59 has the raised portion 58 for defining the plurality of actuator regions 136a,b,c for interaction with the one or more fingers for facilitating the rotation 130 of the actuator body 120 about the pivot connection 122 for displacement from the first position to the second position into the interior 88 of the handle body, wherein the displacement of the actuator body 120 affects the operation of the one or more scanning functions (e.g. via activation of the switch 134 by the control arm 132.

We claim:

1. A handle for a portable computer having a user interface configured for interaction with a stylus, the handle comprising:
a handle body having a grip portion shaped for grasping by a hand of a user of the portable computer, a proximal end of the grip portion for coupling to a housing of the portable computer, and a distal end of the grip portion, the grip portion including an actuator assembly to activate a feature of the portable computer, the proximal end of the grip portion of the handle body further including:
a mechanical coupling to releasably maintain the handle physically attached to the housing of the portable computer; and
a control coupling to electrically connect the actuator assembly to the portable computer to provide signals from the actuator assembly to the portable computer;
a receptacle connected to the handle body and adapted for releasably retaining the stylus; and
a depression at the proximal end of the grip portion and shaped to receive a removable cover disconnected from the housing of the portable computer when the portable computer is attached to the handle,
wherein, when the portable computer is detached from the handle, the removable cover connects to the housing of the portable computer and protects a coupling of the portable computer configured to couple with at least one of the mechanical coupling and the control coupling of the handle body.

2. The handle of claim 1 wherein the receptacle is located in an interior of the handle body, the receptacle adapted for releasably retaining the stylus in the interior of the handle body, the handle body having an aperture for facilitating access of the stylus into the receptacle, at least one member of the receptacle having a first shaped feature adapted for engaging a second shaped feature of the stylus for providing the releasable retaining of the stylus when resident in the receptacle, the member biased towards a first position for facilitating the engagement of the first shaped feature with the second shaped feature.

3. The handle of claim 2, wherein one of the shaped features is a notch and the other of the shaped features is a corresponding protrusion sized to fit in the notch.

4. The handle of claim 3, wherein the notch is located on an exterior surface of the stylus and the protrusion is located on a surface of the member providing an interior surface of the receptacle.

5. The handle of claim 4, wherein the notch extends around at least a portion of a cross-sectional periphery of the exterior surface of the stylus and the protrusion extends around at least a portion of the interior surface of the member of the receptacle.

6. The handle of claim 5, wherein the notch is a groove extending around a circumference of the stylus.

7. The handle of claim 3, wherein the member is an arm having a proximal end connected to a distal end by a central portion and the biasing of the arm is due to a resiliency of the material composition of the arm.

8. The handle of claim 7, wherein the arm is rigidly connected at the proximal end to the handle body and the distal end is adapted to be displaced away from an exterior surface of the stylus when received in the receptacle.

9. The handle of claim 8, wherein the notch is located on the exterior surface of the stylus and the protrusion is located on the arm providing an interior surface of the receptacle.

10. The handle of claim 9, wherein the displacement of the distal end of the arm away from the exterior surface of the stylus is due to interaction between the protrusion and the exterior surface of the central portion.

11. The handle of claim 3 further comprising a pair of the members of the receptacle, the pair of members being positioned within the receptacle opposite to one another, each of the members having at least one first shaped feature for engaging with a corresponding second shaped feature of the stylus, each of the pair of members being operable independently of each other.

12. The handle of claim 11, wherein each of the members is an arm having a having a proximal end connected to a distal end by a central portion and wherein deformation of each arm biases each respective arm towards the first position.

13. The handle of claim 12 further comprising opposing interior surfaces of the arms being arcuate in shape for facilitating contact of an exterior surface of the stylus at multiple locations.

14. The handle of claim 13 further comprising the pair of arms connected at a distal end of a tube of the receptacle, the proximal end of the tube being connected to the aperture and located in the interior of the handle body.

15. The handle of claim 14 further comprising a pair of slots in a sidewall of the tube so as to provide the pair of arms as operable independently of each other.

16. The handle of claim 15, wherein the notch is located on an exterior surface of the stylus and the protrusion is located on a surface of the member providing an interior surface of the receptacle.

17. The handle of claim 16, wherein the notch is a hole in the wall of the stylus having a hollow core.

18. The handle of claim 3 further comprising an abutment surface of the handle body adjacent to the receptacle for engaging with an abutment surface of the stylus at a distal end of the stylus for restricting a magnitude of displacement of the stylus into the receptacle.

19. The handle body of claim 18, wherein the receptacle is located at the distal end of the handle body.

20. The handle of claim 19 further comprising an exterior surface of the distal end of the stylus oriented at an acute angle with respect to a longitudinal axis of the receptacle.

21. The handle of claim 20 further comprising the distal end exterior surface having a textured portion for enhancing a grip of the user with the distal end of the stylus.

22. The handle of claim 1 wherein the control coupling comprises at least one of an electrically conductive pad and an electrical contact, each of which is operable to electrically engage a respective complementary one of an electrically conductive pad and an electrical contact on the portable computer to transmit the signals from the actuator assembly to the portable computer.

23. The handle of claim 22 wherein the electrical contact is a pogo pin.

24. The handle of claim 1 wherein the mechanical coupling comprises at least one protrusion which is complementary to a first slot on the portable computer and at least one latch which can releasably engage a second slot on the portable computer, the at least one protrusion and at least one latch cooperating with the first and second slots respectively to maintain the handle physically attached to the housing of the portable computer.

25. The handle of claim 1 wherein the depression is positioned to retain the removable cover between the handle and the housing of the portable computer.

26. The handle of claim 1 wherein the coupling of the portable computer comprises a second slot for releasably engaging a latch of the mechanical coupling.

27. The handle of claim 1 wherein the coupling of the portable computer comprises an electrically conductive pad or an electrical contact for electrically engaging the control coupling.

* * * * *